United States Patent
Ide et al.

(10) Patent No.: US 7,697,830 B2
(45) Date of Patent: Apr. 13, 2010

(54) DIGITAL CAMERA THAT PERFORMS FOCUS DETECTION USING PHASE DIFFERENCE AND CONTRAST VALUE

(75) Inventors: Masataka Ide, Hachioji (JP); Koichi Nakata, Kokubunji (JP)

(73) Assignee: Olympus Imaging Corp., Tokyo (JP)

( * ) Notice: Subject to any disclaimer, the term of this patent is extended or adjusted under 35 U.S.C. 154(b) by 416 days.

(21) Appl. No.: 11/717,885

(22) Filed: Mar. 14, 2007

(65) Prior Publication Data

US 2007/0230937 A1 Oct. 4, 2007

(30) Foreign Application Priority Data

Mar. 15, 2006 (JP) ............... 2006-071661

(51) Int. Cl.
*G03B 3/00* (2006.01)
(52) U.S. Cl. .................... 396/104; 396/79; 348/208.12; 348/345; 348/349; 348/353
(58) Field of Classification Search .................. 396/79, 396/104; 348/208.12, 345, 349, 353
See application file for complete search history.

(56) References Cited

U.S. PATENT DOCUMENTS

| | | | | | |
|---|---|---|---|---|---|
| 5,905,919 | A | * | 5/1999 | Ide | 396/121 |
| 6,157,783 | A | * | 12/2000 | Ide | 396/106 |
| 6,507,707 | B2 | * | 1/2003 | Nonaka | 396/108 |
| 6,954,233 | B1 | * | 10/2005 | Ito | 348/350 |
| 2001/0036361 | A1 | * | 11/2001 | Suda | 396/111 |
| 2004/0202464 | A1 | * | 10/2004 | Miyasaka et al. | 396/529 |
| 2005/0185086 | A1 | * | 8/2005 | Onozawa | 348/349 |
| 2005/0232621 | A1 | * | 10/2005 | Ito | 396/125 |
| 2006/0018650 | A1 | * | 1/2006 | Ichimiya | 396/104 |
| 2006/0165403 | A1 | * | 7/2006 | Ito | 396/123 |

FOREIGN PATENT DOCUMENTS

| | | |
|---|---|---|
| CN | 2497339 Y | 6/2002 |
| CN | 1661458 A | 8/2005 |
| JP | 07-43605 A | 2/1995 |
| JP | 11-344736 A | 12/1999 |
| JP | 2003-302571 A | 10/2003 |

OTHER PUBLICATIONS

Chinese language Chinese Office Action dated Jul. 25, 2008, issued in a counterpart Chinese Application.

* cited by examiner

*Primary Examiner*—Melissa J Koval
*Assistant Examiner*—Warren K Fenwick
(74) *Attorney, Agent, or Firm*—Frishauf, Holtz, Goodman & Chick, P.C.

(57) ABSTRACT

A digital camera includes a phase difference AF sensor unit, phase difference AF detection unit, contrast AF detection unit, lens driving unit which focuses a taking lens, shading determination unit which determines based on lens information of the taking lens whether focus detection by the phase difference AF sensor unit is possible, and an AF control unit. The AF control unit cause the lens driving unit to focus the taking lens based on a focus detection result of the phase difference AF detection unit when the shading determination unit determines that the focus detection by the phase difference AF sensor unit is possible, and causes the lens driving unit to focus the taking lens based on a focus detection result of the contrast AF detection unit when the shading determination unit determines that the focus detection by the phase difference AF sensor unit is not possible.

8 Claims, 22 Drawing Sheets

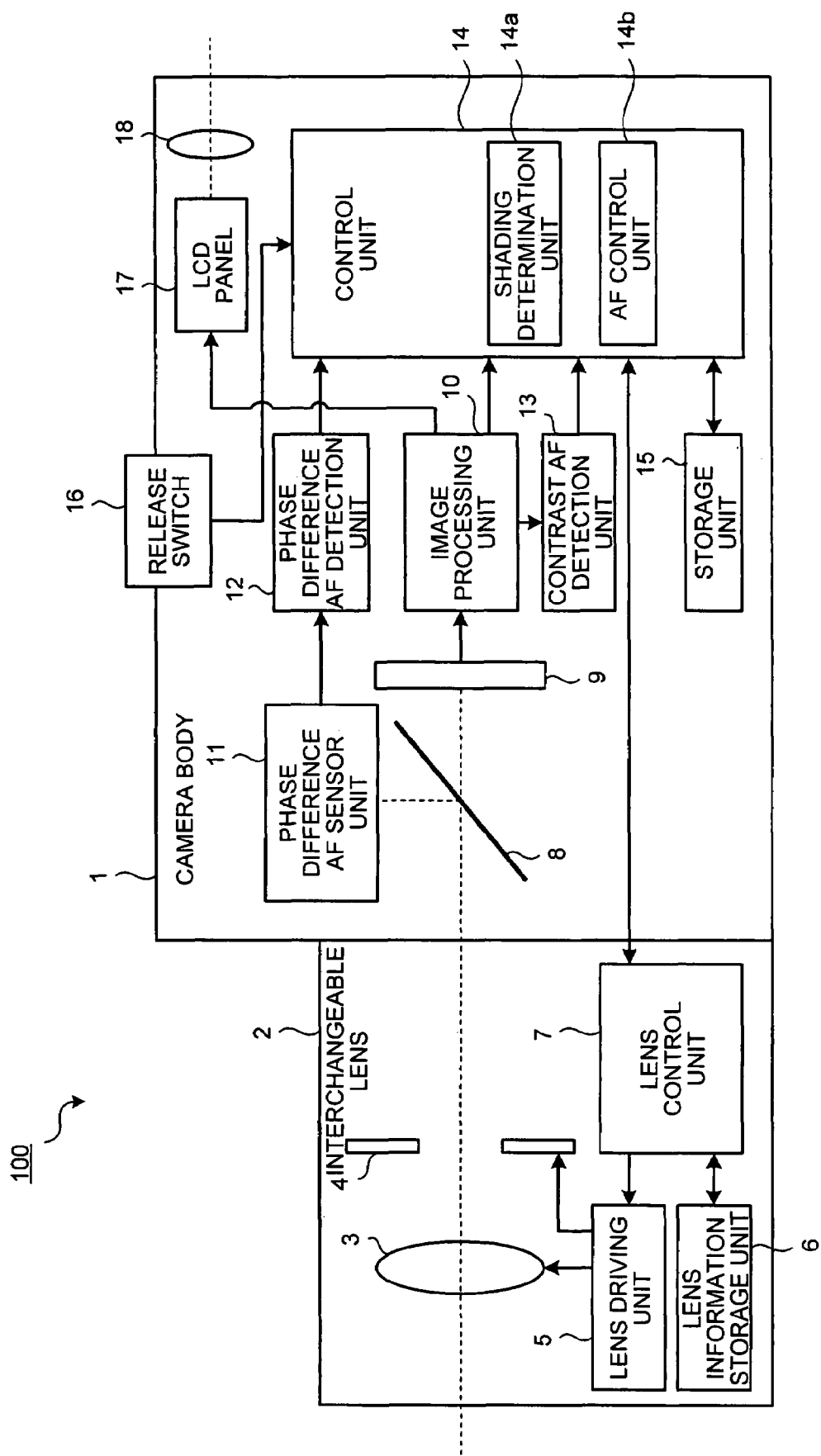

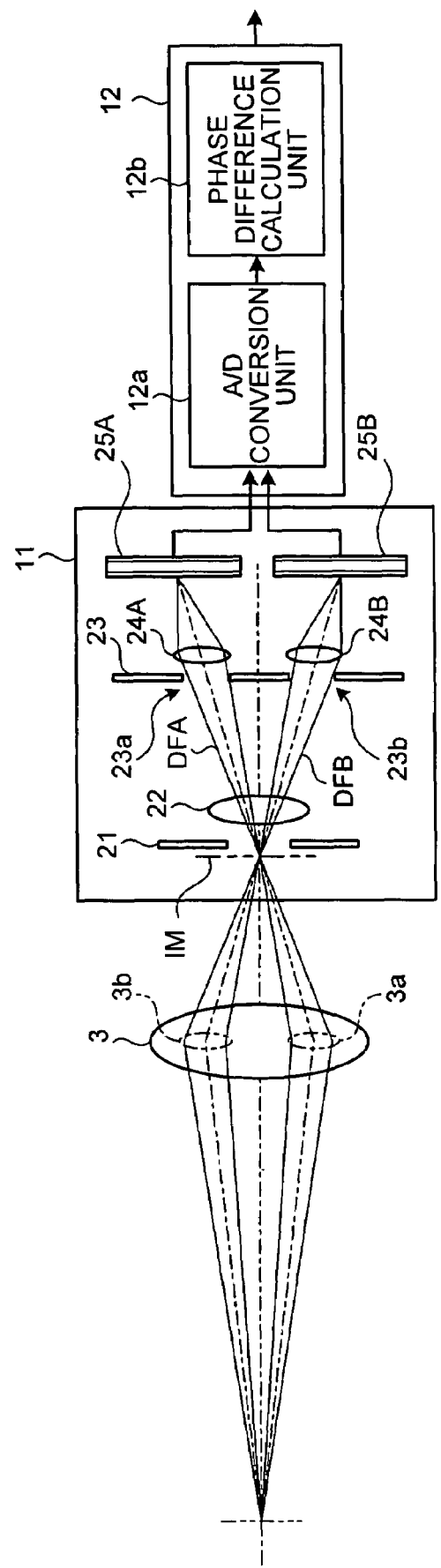

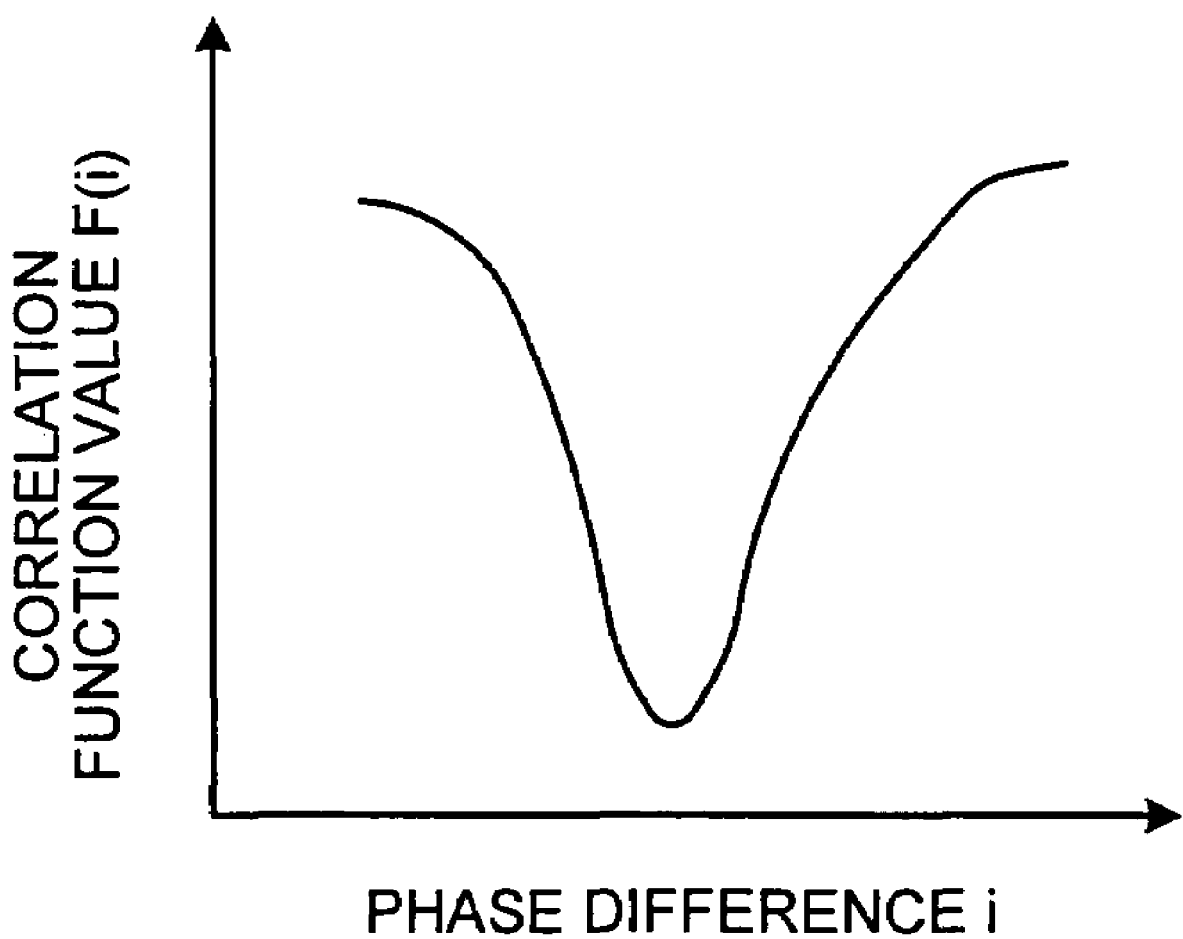

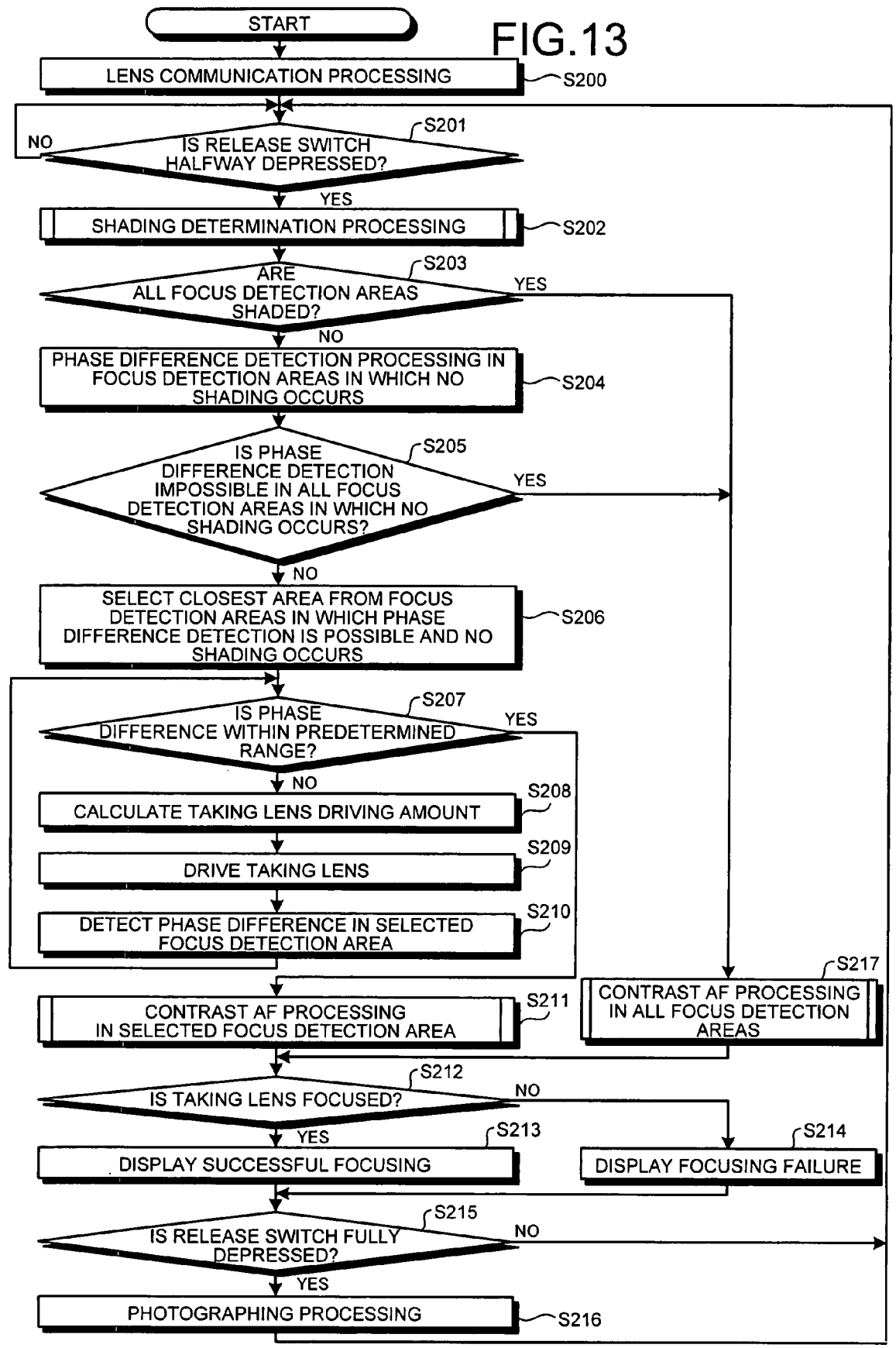

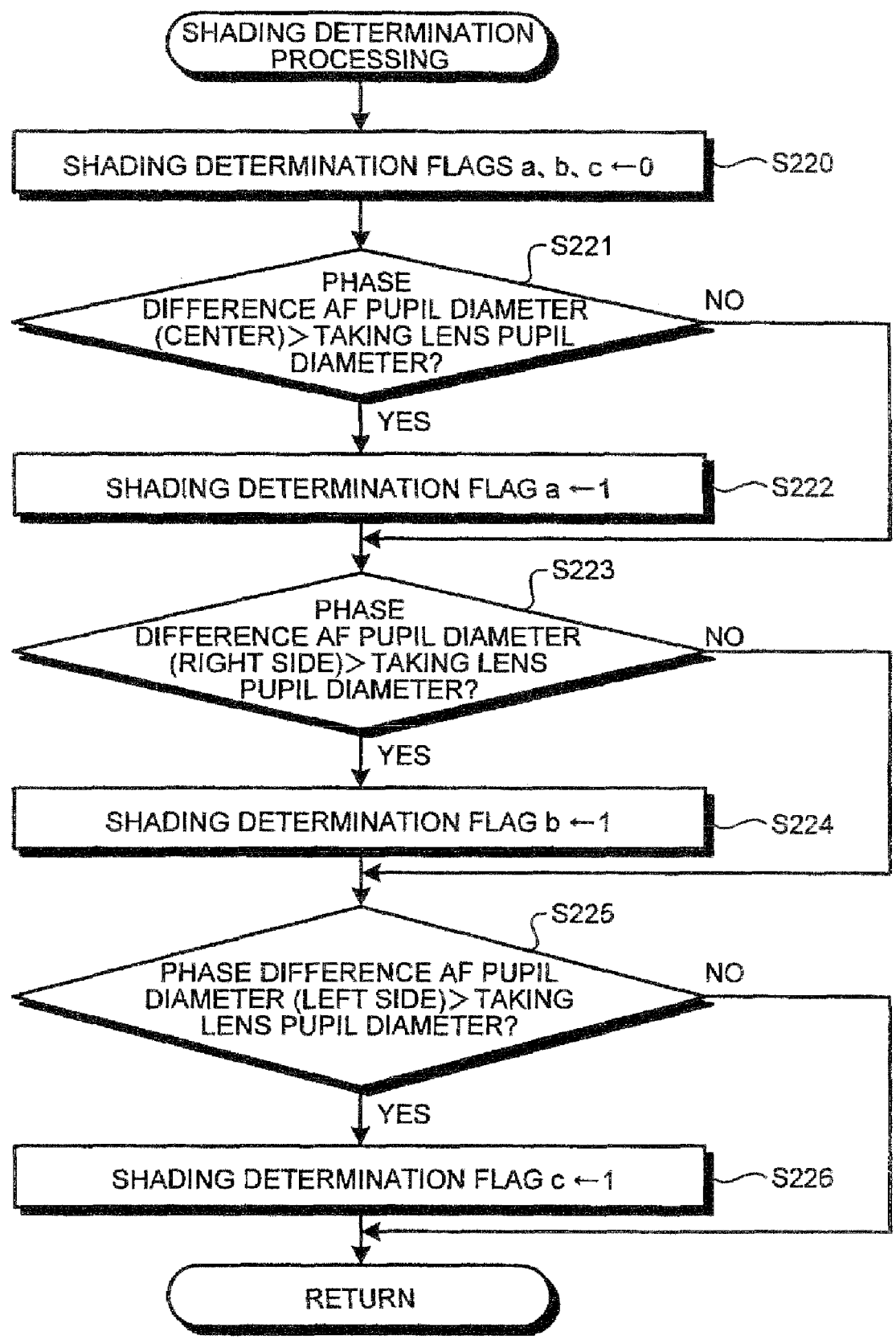

DIGITAL CAMERA THAT PERFORMS FOCUS DETECTION USING PHASE DIFFERENCE AND CONTRAST VALUE

CROSS-REFERENCE TO RELATED APPLICATIONS

This application is based upon and claims the benefit of priority from Japanese Patent Application No. 2006-071661, filed Mar. 15, 2006, the entire contents of which are incorporated herein by reference.

BACKGROUND OF THE INVENTION

1. Field of the Invention

The present invention relates to a digital camera provided with a focusing device that automatically focuses a taking lens for photographing an object image.

2. Description of the Related Art

Conventionally, a TTL (Through The Lens) phase difference auto focus (AF) has often been used as an AF mechanism in a lens-interchangeable single-lens reflex camera using a silver halide film or imaging device as an image pick-up medium. In the TTL phase difference AF, a focus detection mechanism is provided in a camera body and, based on a result of focus detection thereof, a focus is adjusted by driving a part or whole of a taking lens provided with the interchangeable lens using a motor mounted inside the interchangeable lens or camera body.

In a compact digital camera or camcorder, on the other hand, an AF mechanism (hereinafter called a contrast AF) adjusting the focus by driving a taking lens so that, after detecting a contrast value of an object image using high frequency components of an image signal obtained by an imaging device, the contrast value becomes maximum is often used.

Generally, the TTL phase difference AF and the contrast AF have different features. For example, the TTL phase difference AF operates at high speed while the contrast AF can detect the focus with high accuracy and thus an appropriate AF is used for each purpose.

In an auto focusing device described in Japanese Patent Application Laid-Open No. 7-43605, for example, when adjusting the focus by combining the contrast AF and TTL phase difference AF, a coarse adjustment is made by the TTL phase difference AF and then a fine adjustment is made by the contrast AF. Also, in an auto focusing device described in Japanese Patent Application Laid-Open No. 2003-302571, if, in focusing processing in which, like Japanese Patent Application Laid-Open No. 7-43605, a coarse adjustment is made by the TTL phase difference AF and then a fine adjustment is made by the contrast AF, a determination is made that focusing can be obtained by the TTL phase difference AF, a faster focusing operation is implemented by making the TTL phase difference AF have higher priority to perform than the contrast AF does.

The TTL phase difference AF cannot detect the focus accurately if a light flux for focus detection used for focus detection is shaded. In a lens-interchangeable single-lens reflex camera or the like, various kinds of interchangeable lenses can arbitrarily be attached and, when a lens whose F number (FNO) is large or a special lens such as a reflecting telephoto lens is attached, a light flux for focus detection of the TTL phase difference AF may actually be shaded.

However, conventional techniques described above do not mention measure to be taken when a light flux for focus detection of the TTL phase difference AF is shaded and, if a coarse adjustment is made by using the TTL phase difference AF, the contrast AF may be made to perform after moving a taking lens to an incorrect position. As a result, an amount of deviation from a focusing position increases and a time required for focusing operation by the contrast AF also increases.

SUMMARY OF THE INVENTION

It is an object of the present invention to at least partially solve the problems.

A digital camera according to one aspect of the present invention includes a taking lens forming an object image; an imaging device picking up the object image; a first focus detection unit performing focus detection based on a phase difference among a plurality of the object images; a second focus detection unit performing focus detection based on a contrast value of the object image; a focusing unit focusing the taking lens; a determination unit determining based on lens information of the taking lens whether the focus detection by the first focus detection unit is possible; and a control unit that causes the focusing unit to focus the taking lens based on a focus detection result of the first focus detection unit when the determination unit determines that the focus detection by the first focus detection unit is possible, and causes the focusing unit to focus the taking lens based on a focus detection result of the second focus detection unit when the determination unit determines that the focus detection by the first focus detection unit is not possible.

A digital camera according to another aspect of the present invention includes a taking lens having an adjustable diaphragm whose diaphragm diameter is adjustable and forming an object image; an imaging device picking up the object image; a first focus detection unit performing focus detection based on a phase difference among a plurality of the object images; a second focus detection unit performing focus detection based on a contrast value of the object image; a focusing unit focusing the taking lens; a switch; a setting unit setting the adjustable diaphragm to a predetermined F number in accordance with an input operation with the switch; a determination unit determining based on the F number set by the setting unit whether focus detection by the first focus detection unit is possible; and a control unit that causes the focusing unit to focus the taking lens based on a focus detection result of the first focus detection unit when the determination unit determines that the focus detection by the first focus detection unit is possible, and causes the focusing unit to focus the taking lens based on a focus detection result of the second focus detection unit when the determination unit determines that the focus detection by the first focus detection unit is not possible.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a diagram showing a configuration of a digital camera according to a first embodiment of the present invention;

FIG. 2 is a diagram showing an internal configuration of a phase difference AF sensor unit and phase difference AF detecting unit shown in FIG. 1;

FIG. 4 is a diagram showing a calculation example of correlation function values between the detected object images;

FIG. 13 is a flowchart showing a processing procedure for focusing processing according to the second embodiment;

FIG. 14 is a flowchart showing a processing procedure for shading determination processing shown in FIG. 13;

DETAILED DESCRIPTION OF THE PREFERRED EMBODIMENTS

Figure 3A:
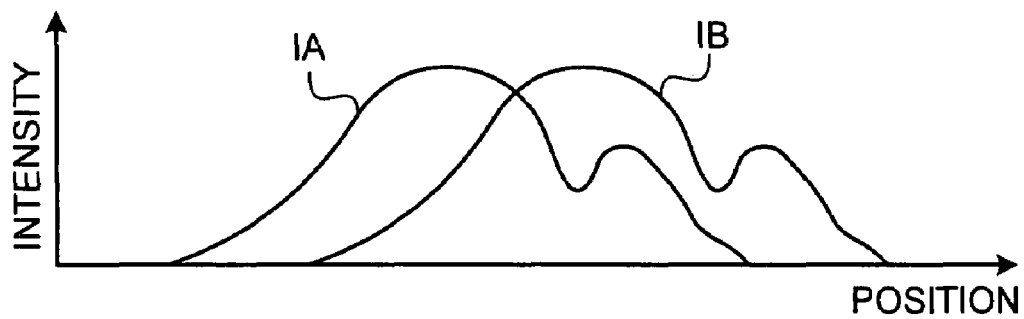
FIG. 3A is a diagram showing object images detected by the phase difference AF sensor unit shown in FIG. 2.

Preferred embodiments of digital camera according to the present invention will be described below with reference to attached drawings.

First, a focusing device and digital camera according to a first embodiment of the present invention will be described. FIG. 1 is a diagram showing a principal part configuration of a digital camera 100 according to the first embodiment. As shown in FIG. 1, the digital camera 100 comprises a camera body 1 and interchangeable lens 2. The interchangeable lens 2 is provided with a taking lens 3, diaphragm 4, lens driving unit 5, lens information storage unit 6, and lens control unit 7. The lens control unit 7 is electrically connected to the lens driving unit 5 and lens information storage unit 6.

The taking lens 3 is configured by using a plurality of lenses or a group of lenses, and the focus is adjusted by moving part or all of the lenses thereof in an optical axis direction. The diaphragm 4 is an adjustable diaphragm provided inside the taking lens 3 and configured to have an adjustable diaphragm diameter, and specifies a pupil diameter and FNO of the taking lens 3 and limits the diameter of a light flux whose image is formed by the taking lens 3. In FIG. 1, however, the taking lens 3 and diaphragm 4 are shown separately to avoid complication. The lens driving unit 5 performs fore-and-aft driving of the taking lens 3 and open/close driving of the diaphragm 4 based on instructions from the lens control unit 7.

The lens information storage unit 6 stores lens information showing photographing conditions of the taking lens 3 and the like as data related to the interchangeable lens 2. The lens information includes, for example, the pupil diameter of the taking lens 3. The lens control unit 7 is electrically connected to the camera body 1 and, based on instructions from the camera body 1, controls processing and operations of the lens driving unit 5 and lens information storage unit 6 and outputs lens information obtained from the lens information storage unit 6 to the camera body 1.

The camera body 1, on the other hand, comprises a half mirror 8, imaging device 9, image processing unit 10, phase difference AF sensor unit 11, phase difference AF detection unit 12, contrast AF detection unit 13, control unit 14, storage unit 15, release switch 16, LCD panel 17, and finder optical system 18. The control unit 14 is electrically connected to each component inside the camera body 1 excluding optical components and the lens control unit 7 of the interchangeable lens 2.

The half mirror 8 reflects part of a light flux (photographing light flux) from an object whose image is to be formed on the imaging device 9 by the taking lens 3 toward the phase difference AF sensor unit 11. Accordingly, the imaging device 9 and the phase difference AF sensor unit 11 can receive the photographing light flux simultaneously for processing. The imaging device 9, which is made of CCD, CMOS, or the like, picks up an object image formed by the taking lens 3 and outputs an image signal of the formed object image to the image processing unit 10.

The image processing unit 10 performs signal processing of the acquired image signal, calculates a contrast value of the object image, and also performs various kinds of image processing such as white balance processing, Y/C processing, and color matrix processing to generate an image shot and a image for the finder. The generated image shot is output to the control unit 14 and the image for the finder is output to the LCD panel 17. The image for the finder output to the LCD panel 17 is displayed by the LCD panel 17 and observed from outside via the finder optical system 18. The image processing unit 10 also outputs the calculated contrast value to the contrast AF detection unit 13.

The phase difference AF sensor unit 11 and phase difference AF detection unit 12 are principal parts of the focus detection mechanism as a TTL phase difference AF and output a focusing position of the taking lens 3 as a result of focus detection thereof to the control unit 14. More specifically, the phase difference AF sensor unit 11 divides a photographing light flux received via the half mirror 8 into two and forms an image of each of the divided two light fluxes to form an object image for each and also detects each object image using separate line sensors.

The phase difference AF detection unit 12 acquires an image signal from each line sensor and, after performing predetermined signal processing, calculates a phase difference corresponding to a relative interval of each object image. Then, the phase difference AF detection unit 12 outputs a driven position of the taking lens 3 when the calculated phase difference is within a predetermined range to the control unit 14 as a focusing position. The phase difference calculated by the phase difference AF detection unit 12 corresponds uniquely to an amount of focus deviation of the taking lens 3.

The contrast AF detection unit 13 is a principal part of the focus detection mechanism as a contrast AF, and creates a history of evaluation values based on contrast values of object images acquired from the image processing unit 10, that is, traces of evaluation values of object images for the driven positions of the taking lens 3 and also detects the focus by detecting the driven position (peak position) of the taking lens 3 where the evaluation value takes a peak value. The contrast AF detection unit 13 outputs the peak position as a result of focus detection to the control unit 14. Here, a focus detection area (detection area of objects) by the contrast AF detection unit 13 is preset so that the focus detection area matches that by the phase difference AF sensor unit 11.

The control unit 14 is provided with a shading determination unit 14a and AF control unit 14b. The shading determination unit 14a determines, based on lens information acquired from the interchangeable lens 2, whether shading occurs in a light flux for focus detection of the TTL phase difference AF, that is, two light fluxes received by the phase difference AF sensor unit 11 after the light flux is divided. The AF control unit 14b controls processing and operations of each unit involved in focusing and, particularly when the shading determination unit 14a determines that shading occurs in two light fluxes as light fluxes for focus detection, performs a control operation to cause the contrast AF detection unit 13 to perform focus detection.

The storage unit 15 comprises ROM in which various processing programs are stored in advance and RAM in which processing parameters of various kinds of processing, processing data and the like are stored. Particularly, the storage unit 15 stores a phase difference AF pupil area showing a pupil area of the taking lens 3 corresponding to light fluxes for focus detection detected by the phase difference AF sensor unit 11 and also lens information of the interchangeable lens 2 acquired by the AF control unit 14b via the lens control unit 7, graph showing determination results by the shading determination unit 14a, image shots processed by the image processing unit 10 and the like when appropriate. Meanwhile, in part of the storage area in which image shots and the like are stored, portable non-volatile memory (not shown) or the like is used and configured to be detachable from the camera body 1.

The release switch 16 is configured as a switch having a button unit provided on a surface part of the camera body 1. If the button unit is halfway depressed, the release switch 16 outputs AF instruction information instructing execution of focus adjustment processing to the control unit 14. Also, if the button unit is fully depressed, the release switch 16 outputs photographing instruction information instructing execution of photographing processing to acquire an object image to the control unit 14. While the release switch 16 is halfway depressed, that is, AF instruction information is being output, the AF control unit 14b performs a control operation to repeatedly perform predetermined focusing processing.

Next, phase difference focus detection processing as focus detection processing performed using the phase difference AF sensor unit 11 and phase difference AF detection unit 12 will be described with reference to FIG. 2 to FIG. 4. FIG. 2 is a diagram showing an internal configuration of the phase difference AF sensor unit 11 and phase difference AF detection unit 12 together with the taking lens 3. In FIG. 2, however, the half mirror 8 arranged on an optical path between the taking lens 3 and the phase difference AF sensor unit 11 is left out to avoid complication.

As shown in FIG. 2, the phase difference AF sensor unit 11 is provided with a visual field mask 21, condensing lens 22, diaphragm mask 23, secondary image formation optical systems 24A and 24B, and line sensors 25A and 25B. The phase difference AF detection unit 12 is provided with an A/D conversion unit 12a and phase difference calculation unit 12b.

The visual field mask 21 is arranged near a projected image formation surface IM, which is a surface on which an object image is formed by the taking lens 3 and is substantially conjugate with an imaging surface of the imaging device 9, and limits an imaging visual field to a predetermined range. The condensing lens 22 condenses a photographing light flux that has passed through the visual field mask 21. The diaphragm mask 23 is provided with openings 23a and 23b symmetrically with respect to an optical axis of the condensing lens 22. Each of the openings 23a and 23b allows part of a photographing light flux condensed by the condensing lens 22 to pass selectively. Light fluxes DFA and DFB as light fluxes for focus detection involved in phase difference focus detection processing are thereby specified and also pupil areas 3a and 3b of the taking lens 3 corresponding to these light fluxes DFA and DFB are specified.

The secondary image formation optical systems 24A and 24B are arranged near the openings 23a and 23b respectively and condense the light fluxes DFA and DFB that have passed through the openings 23a and 23b for image reformation. The line sensors 25a and 25b are imaging devices in which photoelectric conversion elements are arrayed in a direction connecting the opening 23a and the opening 23b and are arranged so that receiving surfaces thereof coincide with image reformation surfaces of the secondary image formation optical systems 24A and 24B respectively. Each of the line sensors 25a and 25b outputs an image signal corresponding to a photographed object image to the phase difference AF detection unit 12.

The A/D conversion unit 12a performs A/D-conversion of each image signal acquired from the line sensors 25A and 25B before the image signal is output. The phase difference calculation unit 12b calculates, based on each image signal acquired from the A/D conversion unit 12a, a phase difference between object images corresponding to the image signals. Here, the phase difference between object images shows a relative spatial relationship of each object image when images corresponding to the two object images are superimposed. More specifically, the phase difference between object images shows a relative interval between two object images separated in the direction connecting the opening 23a and the opening 23b. Images corresponding to two object images are superimposed so that each intersection point of each optical axis of the secondary image formation optical systems 24A and 24B and the line sensors 25a and 25b matches as a reference point.

In phase difference focus detection processing performed using the phase difference AF sensor unit 11 and phase difference AF detection unit 12 configured as described above, focus detection is performed by using a fact that a phase difference between two object images formed by the light fluxes DFA and DFB changes in accordance with a focusing state of the taking lens 3. The phase difference between the two object images is determined from a correlation of each object image.

Figure 3B:
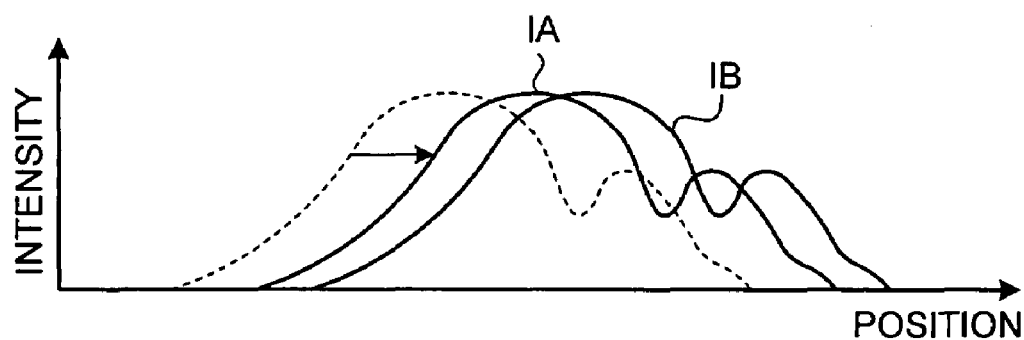
FIG. 3B is a diagram showing a state after shifting one of the object images detected by the phase difference AF sensor unit shown in FIG. 2.

More specifically, if two object images IA and IB are obtained by the phase difference AF sensor unit 11, as shown in FIG. 3A, the phase difference calculation unit 12b calculates an area (strong integral value) where each image does not overlap as a correlation function value of the object images IA and IB. The area is calculated as a summation of absolute values of intensity difference in pixels corresponding to the object images IA and IB. Further, as shown in FIG. 3B, the phase difference calculation unit 12b can also determine a relationship of an area with respect to an interval between the object images IA and IB (or a shift amount of the object image IA) by shifting one pixel (1 bit) of one object image (in this example, the object image IA) at a time and calculating an area in the same manner each time one pixel is shifted.

Figure 3C:
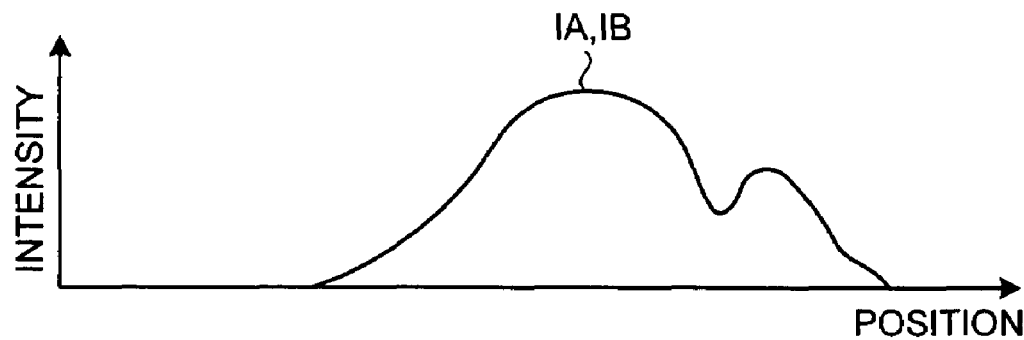
FIG. 3C is a diagram showing a state after shifting one of the object images detected by the phase difference AF sensor unit shown in FIG. 2 to superimpose both images.

In the correlation between the interval and area of object images determined as described above, the area is minimum when the object image IA and the object image IB match, as shown in FIG. 3C. Therefore, the shift amount of the object image IA until the area becomes minimum will be a phase difference between the object images IA and IB to be determined.

More specifically, the phase difference calculation unit 12b calculates a correlation function value between two object images in the following manner: based on image signals L(1), L(2), . . . , L(n) of an object image detected by the line sensor 25A and on image signals R(1), R(2), . . . , R(n) of an object image detected by the line sensor 25B, a correlation function value F(i) for a phase difference i (integral multiple of an image pitch) between two object images is calculated according to the following equation (1):

$$F(i)=\Sigma_j |L(j)-R(j+i)| \quad (1)$$

If, as a result of the above calculation, two object images in the line sensors 25A and 25B are shifted by s pixels, the correlation function value will be F(s)=0. However, each image signal output from the line sensors 25A and 25B seldom matches completely due to noise or the like and the correlation function value will normally be F(s)>0.

FIG. 4 is a diagram showing a calculation example of such correlation function values. In FIG. 4, however, data of discrete values calculated by using equation (1) is shown as continuous data for convenience. After determining the minimum value of the correlation function value F(i), the phase difference calculation unit 12b performs interpolation calculation using correlation functions values around the minimum value to improve detection accuracy.

Next, problems when a light flux for focus detection involved in phase difference focus detection processing is shaded will be described. If part of an area (for example, the pupil areas 3a and 3b shown in FIG. 2) occupied by a light flux for focus detection on a pupil surface of the taking lens 3 is outside the pupil area of the taking lens 3 or the center of a focus detection area involved in phase difference focus detection processing is located at a different position from an intersection point of the optical axis and photographing area of the taking lens 3, part of the light flux for focus detection is limited by vignetting in the taking lens 3. Accordingly, image signals (an A image signal and a B image signal) corresponding to object images formed by two light fluxes used as the light flux for focus detection may be unbalanced.

If the A signal and B signal are unbalanced, the degree of matching of these two image signals in correlation calculation will be low, causing an error in the calculated phase difference. If the A signal and B signal are more markedly unbalanced, the correlation calculation itself may become impracticable, making focus detection impossible.

Figure 5A:
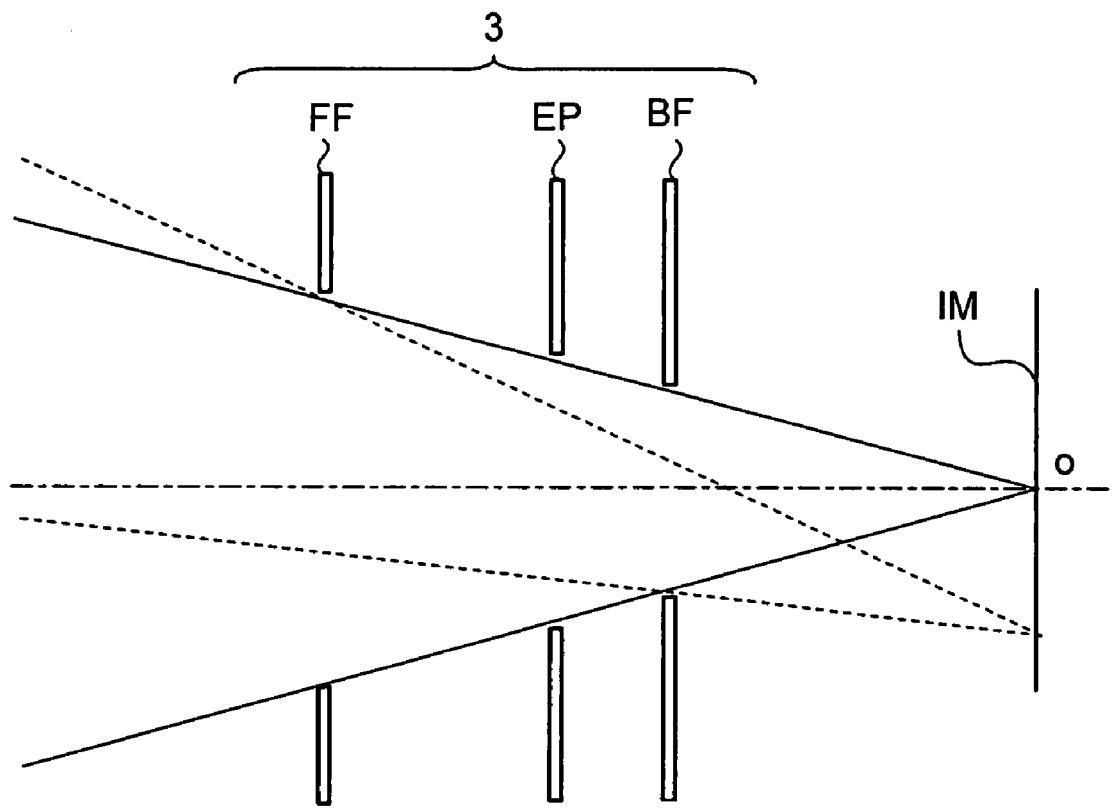
FIG. 5A is a diagram illustrating vignetting in a taking lens of a light flux for focus detection.
Figure 5B:
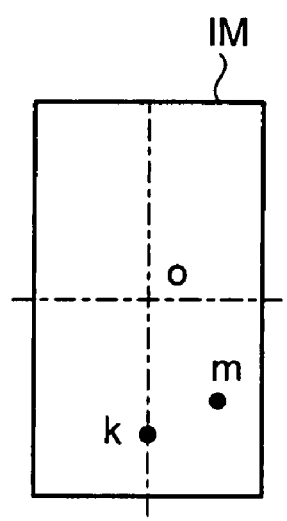
FIG. 5B is a front view showing a projected image formation surface shown in FIG. 5A.

FIG. 5A is a diagram showing how a light flux for focus detection involved in phase difference focus detection processing is limited by vignetting in the taking lens 3. FIG. 5B is a front view of the projected image formation surface IM shown in FIG. 5A when viewed from the optical axis direction. The taking lens 3 is actually comprised of a plurality of lenses, as shown in FIG. 5A, and the light flux for focus detection is limited, among the plurality of lenses, by a lens holding frame (back frame) BF of a lens on a side closest to the projected image formation surface IM and a lens holding frame (front frame) FF of a lens on a side closest to objects.

Figure 6A:
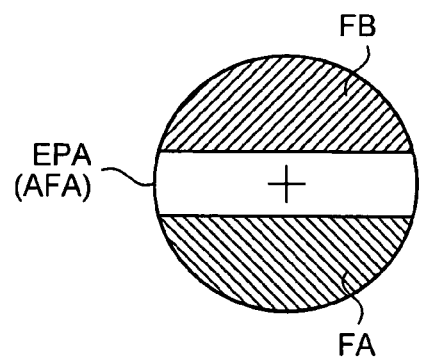
FIG. 6A is a diagram exemplifying vignetting in the taking lens of light fluxes for focus detection.

FIG. 6A to FIG. 6D are diagrams showing states of light fluxes for focus detection in an exit pupil EP of the taking lens 3. Here, two light fluxes as the light fluxes for focus detection are shown as light fluxes FA and FB corresponding to the A image signal and B image signal respectively. FIG. 6A shows a state of the light fluxes FA and FB that form an image at point O shown in FIG. 5B. The point O is a point on the optical axis of the taking lens 3 and the light fluxes FA and FB that form an image at this point O are not shaded at all.

Figure 6B:
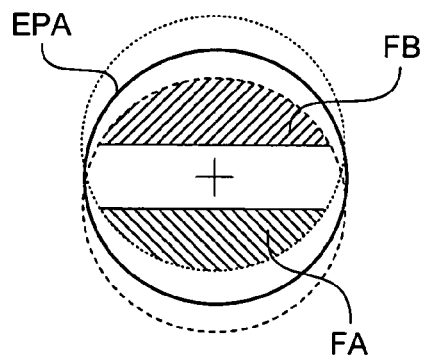
FIG. 6B is a diagram exemplifying vignetting in the taking lens of light fluxes for focus detection.
Figure 6C:
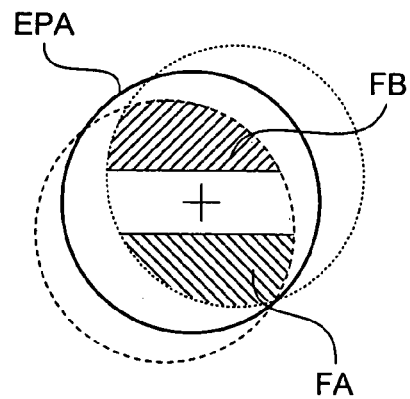
FIG. 6C is a diagram exemplifying vignetting in the taking lens of light fluxes for focus detection.

FIG. 6B and FIG. 6C show states of the light fluxes FA and FB that form an image at points k and m deviating from the optical axis shown in FIG. 5B respectively. The point k is a point that deviates from the optical axis of the taking lens 3 in a Y direction (downward direction in FIG. 5B) and the light fluxes FA and FB forming an image at this point k are almost uniformly shaded in a vertical direction in FIG. 5B. The point m, on the other hand, is a point that deviates also from the optical axis of the taking lens 3 in a X direction (horizontal direction in FIG. 5B) and the light fluxes FA and FB forming an image at this point m are shaded more intricately.

Figure 6D:
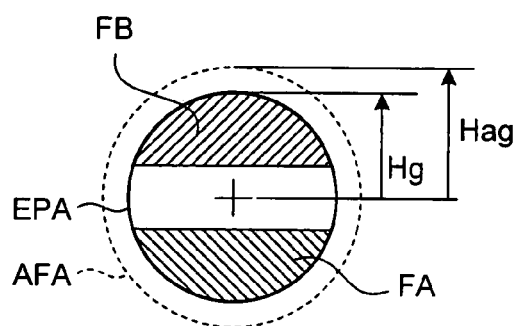
FIG. 6D is a diagram exemplifying vignetting in the taking lens of light fluxes for focus detection.

Further, FIG. 6D shows a state of the light fluxes FA and FB that form an image at point O when FNO of the taking lens 3 is large. In this case, a taking lens pupil area EPA showing an effective pupil area of the taking lens 3 is smaller than a phase difference AF pupil area AFA circumscribing each pupil area on the exit pupil EP corresponding to the light fluxes FA and FB to encircle the pupil areas. That is, a pupil radius Hg of the taking lens pupil area EPA is smaller than a pupil radius Hag of the phase difference AF pupil area AFA. Thus, the light fluxes FA and FB are shaded even if the light fluxes FA and FB form an image at point O on the optical axis.

With light fluxes for focus detection being shaded, as described above, a relative difference arises between the A image signal and B image signal and further an interval between centers of gravity of two object images changes, resulting in an error of the phase difference to be detected and detection of an incorrect focusing position in phase difference focus detection processing.

Figure 7:
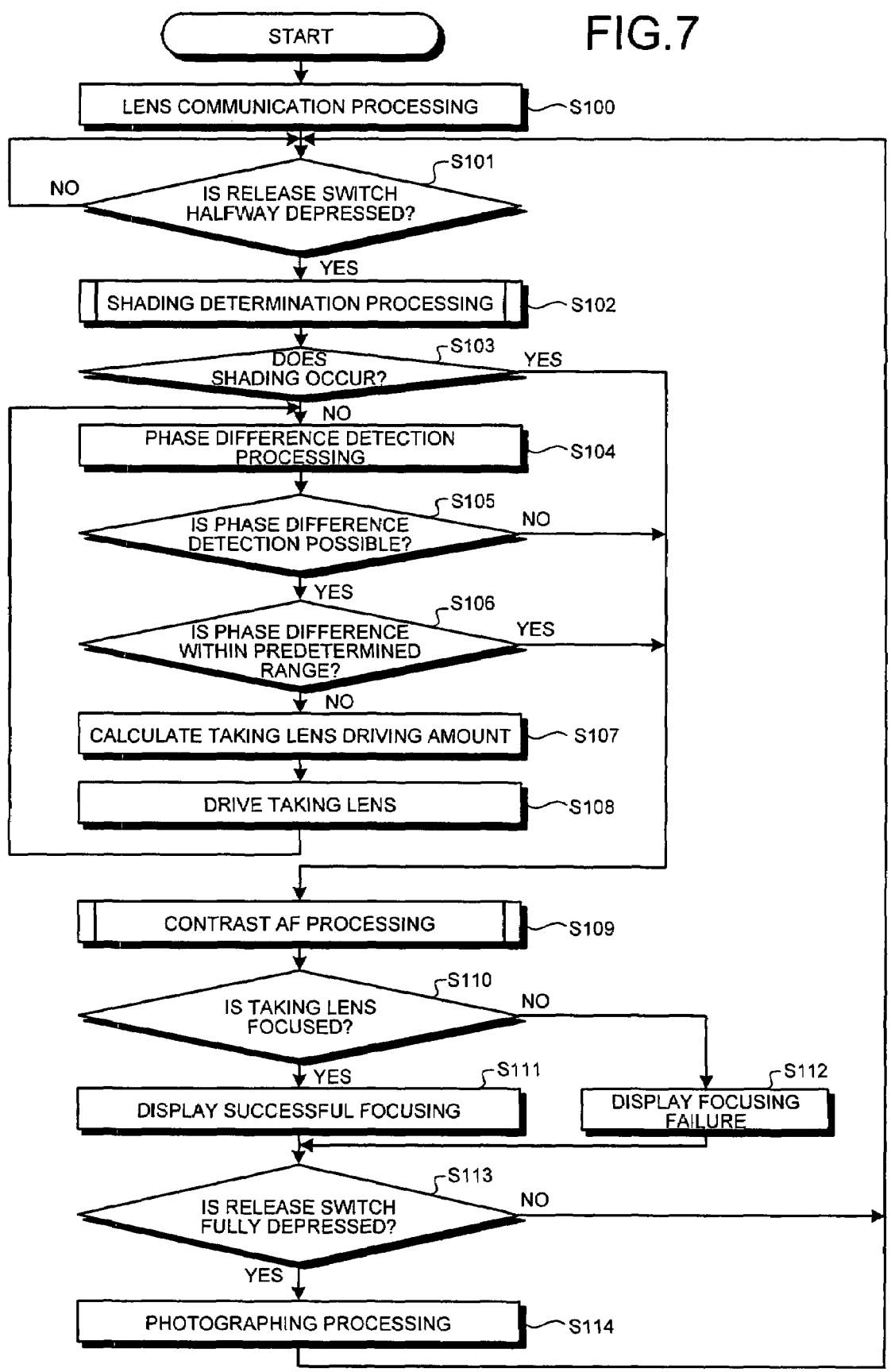
FIG. 7 is a flowchart showing a processing procedure for focusing processing according to the first embodiment.

Next, a processing procedure for focusing processing performed by the digital camera 100 will be described. FIG. 7 is a flowchart showing the processing procedure for focusing processing. As shown in FIG. 7, the control unit 14 communicates with the lens control unit 7 of the interchangeable lens 2 when the digital camera 100 is turned on to perform lens communication processing in which various kinds of lens information stored in the lens information storage unit 6 are read and also the lens information read from the lens information storage unit 6 are recorded in the storage unit 15 (step S100). Lens information read in the lens communication processing includes the pupil diameter of the taking lens 3, driving range of the taking lens 3 in contrast AF processing, various correction values related to focusing processing and the like.

Then, the control unit 14 determines whether the release switch 16 is halfway depressed (step S101) and, if the release switch 16 is not halfway depressed (step S101: No), repeats this determination processing. The control unit 14 determines that the release switch 16 is halfway depressed by acquiring AF instruction information from the release switch 16.

If the release switch 16 is halfway depressed (step S101: Yes), the shading determination unit 14*a* performs shading determination processing to determine whether light fluxes for focus detection involved in phase difference focus detection processing are shaded (step S102). Then, based on a determination result of this shading determination processing, the AF control unit 14*b* determines whether light fluxes for focus detection are shaded (step S103) and, if it is determined that the light fluxes for focus detection are shaded (step S103: Yes), performs contrast AF processing at step S109. If, on the other hand, it is determined that the light fluxes for focus detection are not shaded (step S103: No), the AF control unit 14*b* performs phase difference focus detection processing of step S104 and the subsequent steps. At this step S103, the AF control unit 14*b* determines whether shading occurs by referring to a shading determination flag showing a determination result of shading determination processing. Details of the shading determination processing will later be described separately.

At step S104, the AF control unit 14*b* detects an object image from light fluxes for focus detection by using the phase difference AF sensor unit 11 and, based on a signal of the image object, performs phase difference detection processing in which a phase difference is calculated by the phase difference AF detection unit 12. Further, based on the calculated phase difference, the AF control unit 14*b* determines whether phase difference detection has been possible, reliability (degree of reliability) of the phase difference detection and the like and then records determination result thereof in a flag or the like.

After performing processing at step S104, the AF control unit 14*b* determines whether phase difference detection has been possible by referring to the flag or the like where the determination result at step S104 is recorded (step S105) and, if phase difference detection has not been possible (step S105: No), performs contrast AF processing at step S109. If, on the other hand, phase difference detection has been possible (step S105: Yes), the AF control unit 14*b* further determines whether the detected phase difference is within a predetermined range, that is, a focus deviation amount of the taking lens 3 is within a predetermined range (step S106). The predetermined range to be a criterion at this step S106 is a preset range so that, if found to be within this range, focusing can be performed by contrast AF processing with sufficiently high accuracy and at high speed.

If the phase difference is within the predetermined range (step S106: Yes), the AF control unit 14*b* performs contrast AF processing at step S109. If, on the other hand, the phase difference is not within the predetermined range (step S106: No), the AF control unit 14*b* calculates, based on the calculated phase difference, a driving amount of the taking lens 3 required for focusing (step S107) and drives the taking lens 3 in accordance with the calculated driving amount (step S108). At this step S108, the AF control unit 14*b* outputs the calculated driving amount to the lens control unit 7 so that the lens control unit 7 is caused to control the lens driving unit 5 to drive the taking lens 3. Then, the AF control unit 14*b* repeats processing of step S104 and the subsequent steps, if it is determined that the phase difference is within the predetermined range at step S106, and the procedure advances to the contrast AS processing.

After performing contrast AF processing at step S109 described later, the AF control unit 14*b* determines whether it has been possible to focus the taking lens 3 (step S110) and, if it has been possible to focus the taking lens 3 (step S110: Yes), causes the LCD panel 17 or the like to display a message of successful focusing (S111). If, on the other hand, it has not been possible to focus the taking lens 3 (step S110: No), the AF control unit 14*b* causes the LCD panel 17 or the like to display a message of focusing failure (S112). At step S110, the AF control unit 14*b* makes a determination by referring to a flag or the like showing a processing result of the contrast AF processing at step S109.

Then, the control unit 14 determines whether the release switch 16 is fully depressed (step S113) and, if the release switch 16 is fully depressed (step S113: Yes), performs normal photographing processing for photographing an object (step S114) and, after completing the photographing processing, repeats processing of step S101 the subsequent steps. If, on the other hand, the release switch 16 is not fully depressed (step S113: No), the control unit 14 immediately repeats processing of step S101 the subsequent steps. Such repetition of processing terminates when a predetermined processing abort instruction is input, for example, when the digital camera 100 is turned off.

In the digital camera 100, as described above, a coarse adjustment of focusing is made by the TTL phase difference AF as a basic operation and then a fine adjustment of focusing is made by the contrast AF. In addition, whether light fluxes for focus detection of the TTL phase difference AF are shaded is determined and, if it is determined that the light fluxes for focus detection are shaded, focusing processing by the contrast AF is performed without performing focusing processing by the TTL phase difference AF.

Figure 8:
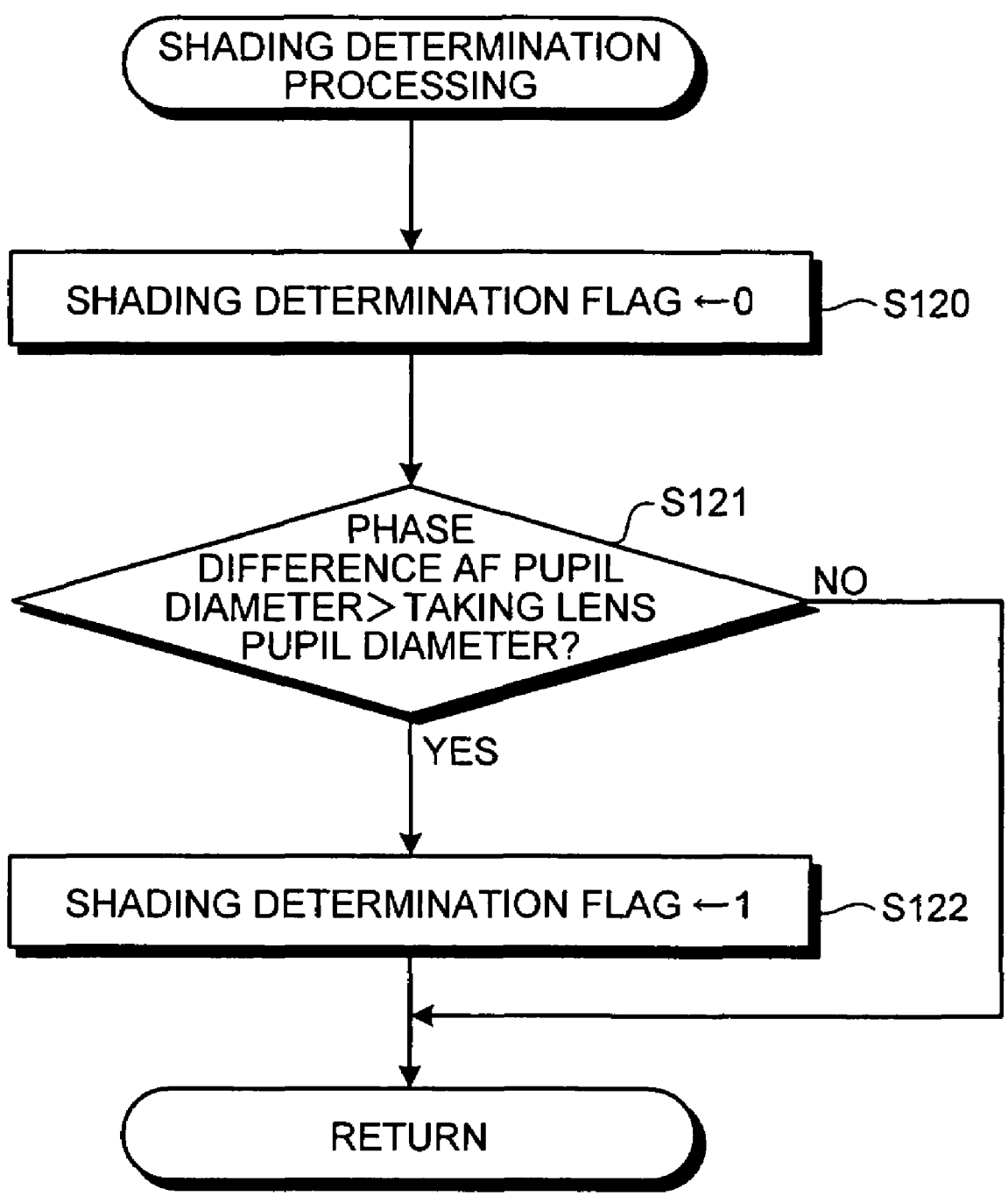
FIG. 8 is a flowchart showing a processing procedure for shading determination processing shown in FIG. 7.

Next, a processing procedure for shading determination processing shown as step S102 will be described. FIG. 8 is a flowchart showing the processing procedure for shading determination processing. As shown in FIG. 8, the shading determination unit 14*a* first initializes a shading determination flag by setting "0" to the flag (step S120) and determines whether a phase difference AF pupil diameter showing the size of the phase difference AF pupil area AFA is larger than a taking lens pupil diameter showing the size of the taking lens pupil area EPA (step S121).

If the phase difference AF pupil diameter is larger than the taking lens pupil diameter (step S121: Yes), the shading determination unit 14*a* sets "1" to the shading determination flag (step S122) before returning to step S102. If, on the other hand, the phase difference AF pupil diameter is not larger than the taking lens pupil diameter (step S121: No), the shading determination unit 14*a* immediately returns to step S102.

In the shading determination processing according to the first embodiment, as described above, the shading determination unit 14*a* compares the size of the phase difference AF pupil diameter stored in advance in the storage unit 15 in accordance with the configuration of the phase difference AF sensor unit 11 and that of the taking lens pupil diameter read as lens information in the lens communication processing at step S100 and, if the phase difference AF pupil diameter is larger, determines that light fluxes for focus detection involved in phase difference focus detection processing are shaded and records a determination result thereof in the shading determination flag.

Figure 9:
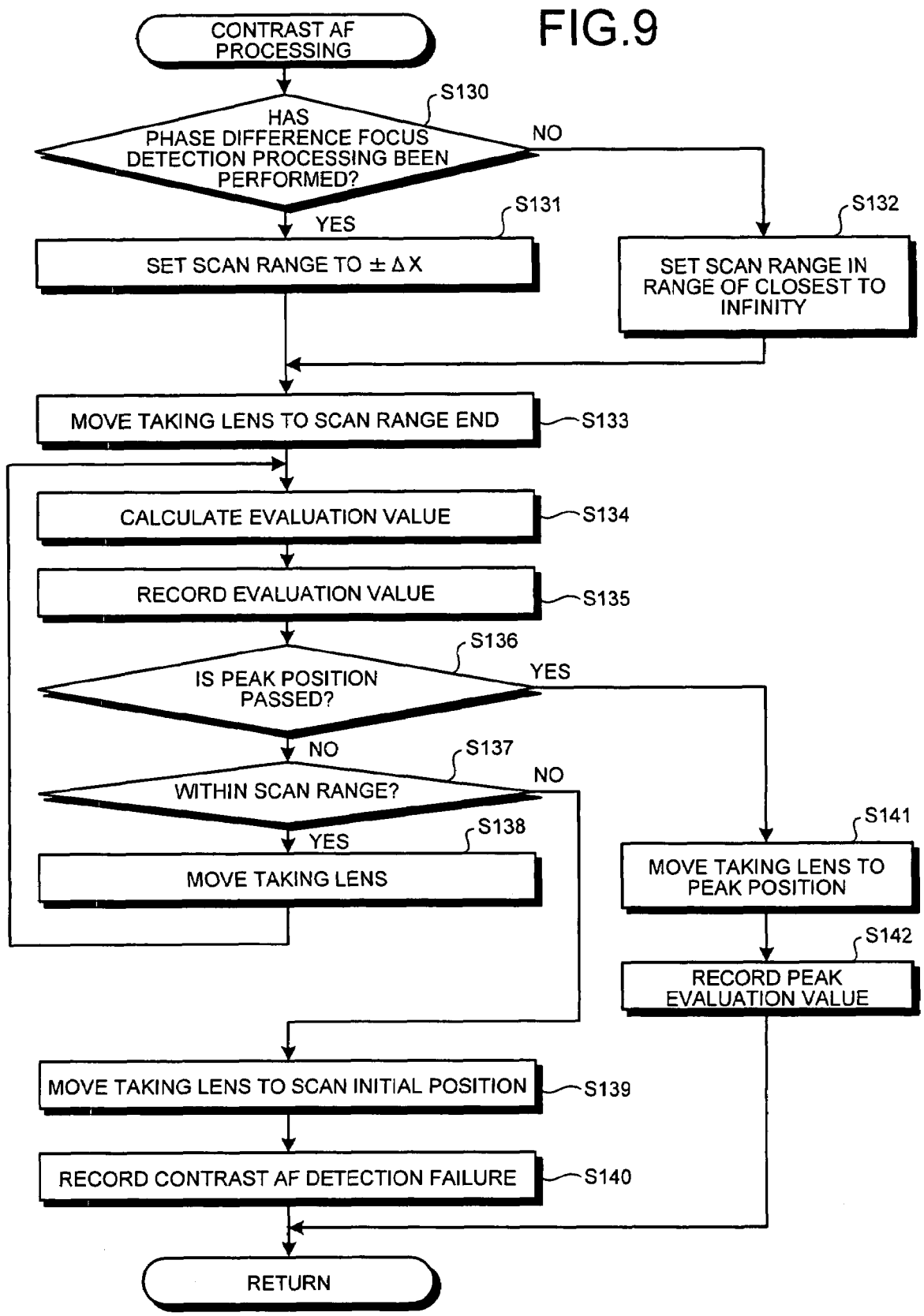
FIG. 9 is a flowchart showing a processing procedure for contrast AF processing shown in FIG. 7.

Next, a processing procedure for contrast AF processing shown as step S109 will be described. FIG. 9 is a flowchart showing the processing procedure for contrast AF processing. As shown in FIG. 9, the AF control unit 14b first refers to a predetermined flag or the like to determine whether phase difference focus detection processing has been performed (step S130). Then, if the phase difference focus detection processing has been performed (step S130: Yes), the AF control unit 14b sets a scan range to "±ΔX" (step S131) and, if the phase difference focus detection processing has not been performed (step S130: No), the AF control unit 14b sets the scan range to a whole range of movement of the taking lens 3, that is, from the closest range to infinity (step S132). If the focus could not be detected even if the phase difference detection processing has been performed, that is, the contrast AF is performed after determining that a phase difference was not detectable at step S105 shown in FIG. 7, the AF control unit 14b determines that phase difference focus detection processing has not been performed at step S130 and the procedure advances to step S132.

Here, the scan range is a range in which the taking lens 3 is driven when a trace of evaluation values of an object image with respect to the driven position of the taking lens 3 is determined by the contrast AF detection unit 13. At step S131, a range ΔX is set as the scan range to around the center of the current driven position of the taking lens 3. The range ΔX is a predetermined range in which a focusing operation by the contrast AF is assumed to be executable with sufficiently high accuracy and at high speed and is stored in the lens information storage unit 6 of the interchangeable lens 2 before being read and used by lens communication processing at step S100. Various values are preset to the range ΔX in accordance with a focal length and driven position of the taking lens 3, the degree of reliability of phase difference focus detection processing and the like. At step S132, on the other hand, since phase difference focus detection processing has not been performed in advance and the taking lens 3 may not be positioned near the focusing position, the whole range of movement of the taking lens 3 is set as the scan range.

After setting the scan range, the AF control unit 14b moves the taking lens 3, of positions at both ends in the scan range, to the one closer from the current driven position of the taking lens 3 (step S133). At this point, the AF control unit 14b moves the taking lens 3 by outputting the position to which the taking lens should be moved to the lens control unit 7 to cause the lens control unit 7 to control the lens driving unit 5.

Subsequently, the AF control unit 14b calculates an evaluation value of an object image by using the contrast AF detection unit 13 (step S134) and records the calculated evaluation value and the drive position of the taking lens 3 as history information of the evaluation value in the storage unit 15 (step S135). Then, the AF control unit 14b refers to the history information of the evaluation value to determine whether the driven position of the taking lens 3 has passed a focusing position, that is, a peak position where the evaluation value takes a maximum value (step S136).

If the taking lens 3 has not passed the peak position (step S136: No), the AF control unit 14b determines whether the taking lens 3 is within the scan range (step S137) and, if the taking lens 3 is within the scan range (step S137: Yes), moves the taking lens 3 (step S138) before repeating processing of step S134 and the subsequent steps. If, on the other hand, the taking lens 3 is not within the scan range (step S137: No), the AF control unit 14b moves the taking lens 3 to an initial position of the scan range (step S139) and records information indicating that no focusing position could be detected by contrast AF processing in a flag or the like (step S140) before returning to step S109.

If the AF control unit 14b determines that the taking lens 3 has passed the peak position at step S136 (step S136: Yes), the AF control unit 14b moves the taking lens 3 to the peak position (step S141) and records the peak value of the evaluation value as a peak evaluation value (step S142) before returning to step S109.

The digital camera 100 according to the first embodiment is provided, as described above, with a focus detection mechanism using the TTL phase difference AF and contrast AF and also a focusing device that adjusts the focus based on a focus detection result of each unit of the focus detection mechanism, and the focusing device is provided with the shading determination unit 14a that determines whether light fluxes for focus detection involved in phase difference focus detection processing are shaded based on lens information of the taking lens 3 and the AF control unit 14b that performs a control operation to cause the focus detection mechanism using the contrast AF to detect the focus when the shading determination unit 14a determines that the light fluxes for focus detection are shaded. Accordingly, the digital camera 100 and the focusing device according to the first embodiment can adjust the focus at high speed and with high accuracy without being defocused by erroneous detection even if light fluxes for focus detection involved in phase difference focus detection processing are shaded.

Next, a focusing device and digital camera according to a second embodiment of the present invention will be described. While the focus detection area of the focus detection mechanism using the TTL phase difference AF is one point in the above first embodiment, the detection area is a plurality of points in the second embodiment and the TTL phase difference AF and contrast AF are controlled to be used appropriately in accordance with shading conditions of light fluxes for focus detection for each focus detection area.

Figure 10:
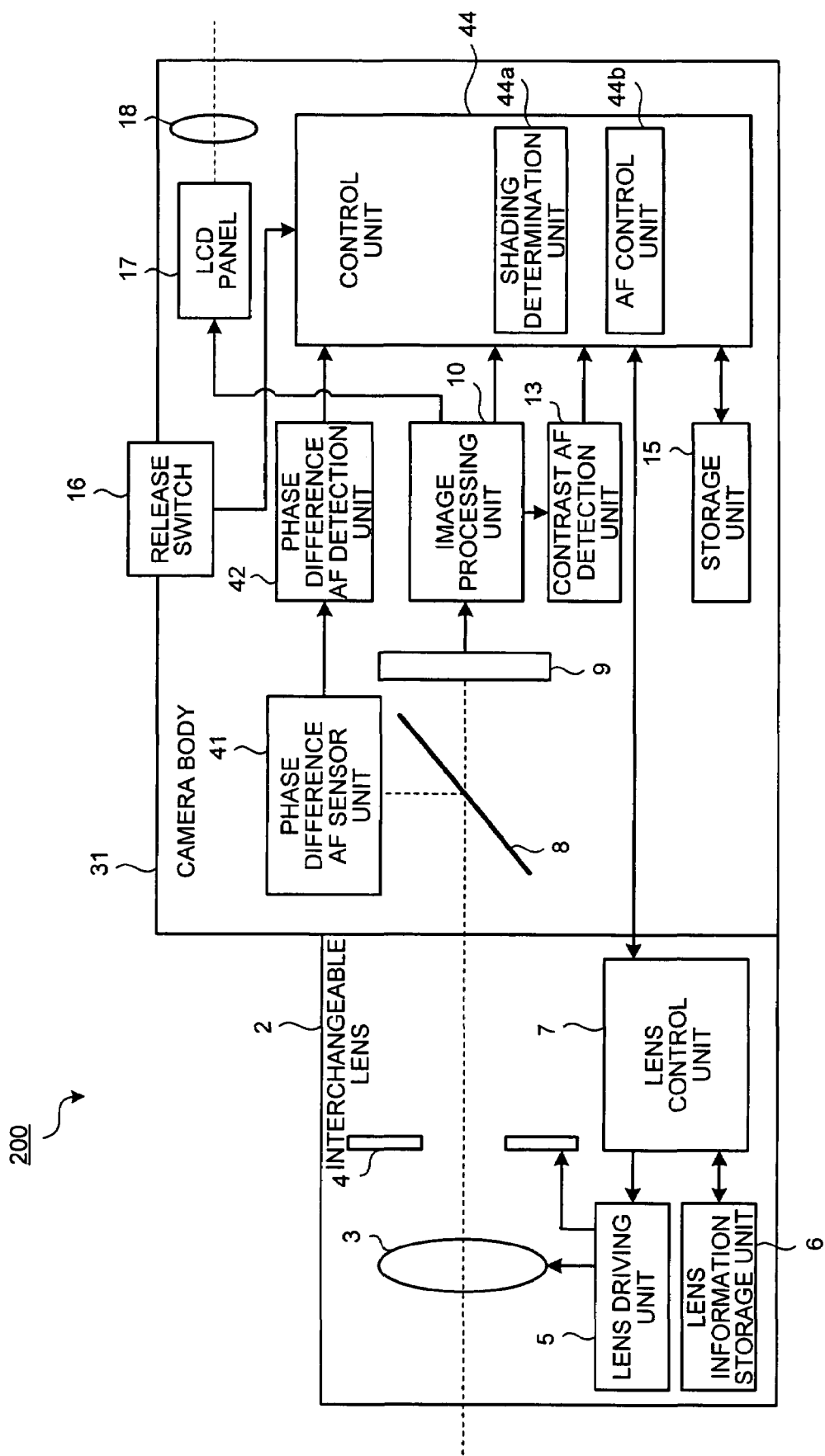
FIG. 10 is a diagram showing the configuration of a digital camera according to a second embodiment of the present invention.

FIG. 10 is a diagram showing the principal part configuration of a digital camera 200 according to the second embodiment. As shown in FIG. 10, the digital camera 200 is provided, based on the configuration of the digital camera 100, with a camera body 31 in place of the camera body 1. The camera body 31 is provided, based on the configuration of the camera body 1, with a phase difference AF sensor unit 41, phase difference AF detection unit 42, and control unit 44 in place of the phase difference AF sensor unit 11, phase difference AF detection unit 12, and control unit 14 respectively. Further, the control unit 44 is provided, based on the configuration of the control unit 14, with a shading determination unit 44a and AF control unit 44b in place of the shading determination unit 14a and AF control unit 14b.

Figure 11:
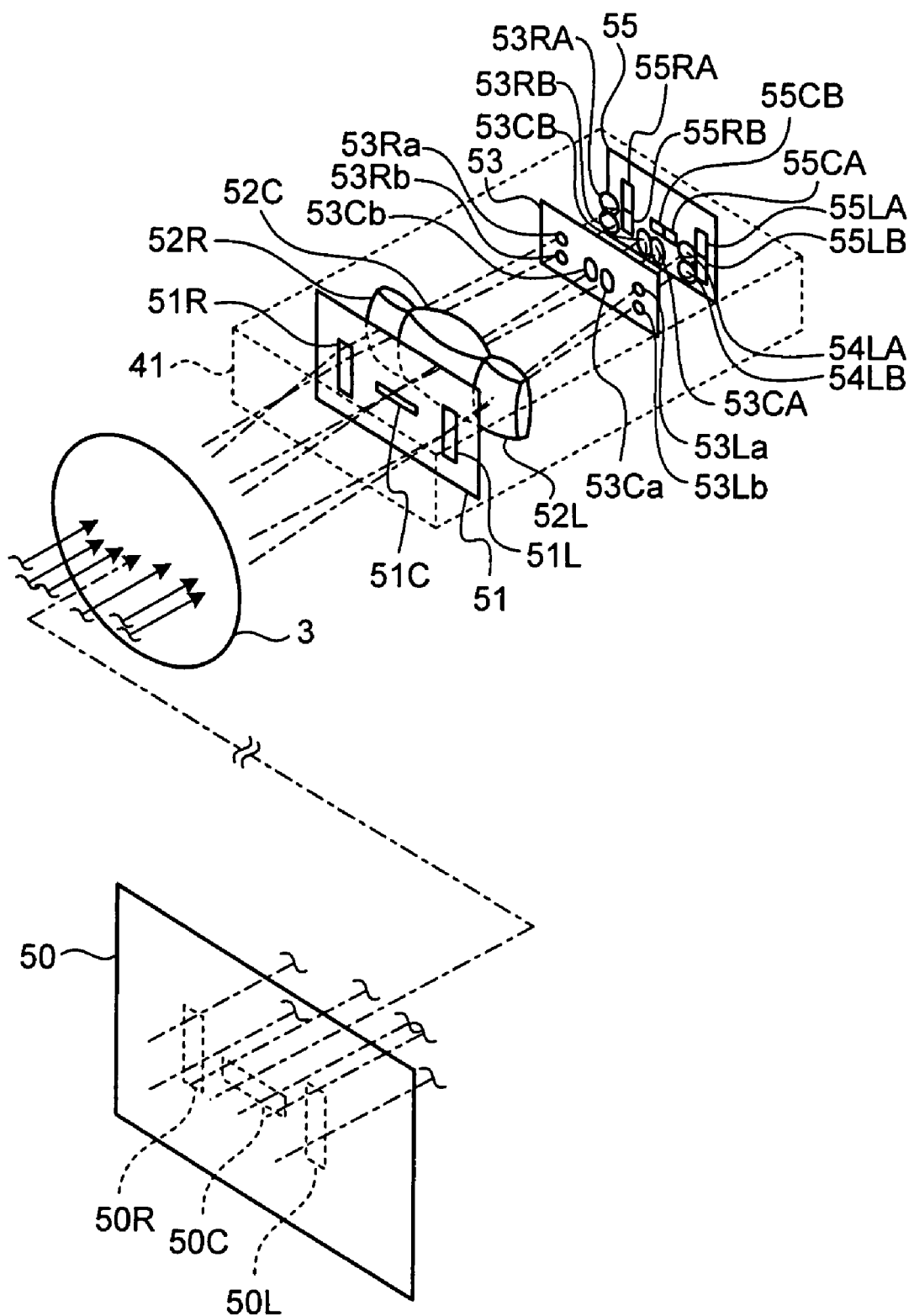
FIG. 11 is the internal configuration of a phase difference AF sensor unit shown in FIG. 10.

FIG. 11 is a diagram showing the internal configuration of the phase difference AF sensor unit 41 together with the taking lens 3. In FIG. 11, however, the half mirror 8 arranged on an optical path between the taking lens 3 and the phase difference AF sensor unit 41 is left out to avoid complication. As shown in FIG. 11, the phase difference AF sensor unit 41 is provided with a visual field mask 51, condensing lenses 52C, 52L, and 52R, diaphragm mask 53, group of image formation lenses as a secondary image formation optical system, and sensor 55. The secondary image formation optical system is provided with image formation lenses 54CA, 54CB, 54LA, 54LB, 54RA, and 54RB.

The phase difference AF sensor unit 41 divides a photographing light flux in accordance with a plurality of focus detection areas 50C, 50L, and 50R set inside a photographing area 50 of the taking lens 3 and then detects an object image for each focus detection area and also outputs an image signal corresponding to each object image to the phase difference AF detection unit 42.

Here, the visual field mask 51 is arranged near an image formation surface of object images by the taking lens 3 and openings 51C, 51L, and 51R formed on the visual field mask 51 allow a photographing light flux to pass after dividing the photographing light flux in accordance with the focus detection areas 50C, 50L, and 50R. The condensing lenses 52C, 52L, and 52R are arranged near the openings 51C, 51L, and 51R respectively to condense a light flux that has passed through the corresponding opening.

The diaphragm mask 53 has a pair of openings formed symmetrically with respect to each optical axis of the condensing lenses 52C, 52L, and 52R and each pair of openings further divides the light flux from each of corresponding condensing lenses 52C, 52L, and 52R into two light fluxes to allow the light fluxes to pass as light fluxes for focus detection. More specifically, the diaphragm mask 53 has openings 53Ca and 53Cb formed symmetrically with respect to the optical axis of the condensing lens 52C. The diaphragm mask 53 also has openings 53La and 53Lb formed symmetrically with respect to the optical axis of the condensing lens 52L and openings 53Ra and 53Rb formed symmetrically with respect to the optical axis of the condensing lens 52R.

Each image formation lens of the secondary image formation optical system is arranged near each opening of the diaphragm mask 53 to reform an image by condensing the light fluxes for focus detection that have passed through the corresponding opening. More specifically, the image formation lenses 54CA, 54CB, 54LA, 54LB, 54RA, and 54RB are arranged corresponding to the openings 53Ca, 53Cb, 53La, 53Lb, 53Ra, and 53Rb respectively.

The sensor 55 is provided with a plurality of line sensors corresponding to light fluxes for focus detection from each image formation lens and is arranged in such a way that each receiving surface matches an image reformation surface of each corresponding image formation lens. More specifically, the sensor 55 is provided with line sensors 55CA, 55CB, 55LA, 55LB, 55RA, and 55RB and each of these line sensors is arranged so that light fluxes for focus detection reformed by the image formation lenses 54CA, 54CB, 54LA, 54LB, 54RA, and 54RB are detected respectively. Each line sensor outputs an image signal corresponding to a detected object image to the phase difference AF detection unit 42.

The phase difference AF sensor unit 41 can thereby detect each light flux for focus detection corresponding to the focus detection areas 50C, 50L, and 50R by the line sensors 55CA and 55CB, line sensors 55LA and 55LB, and line sensors 55RA and 55RB respectively and output an image signal for each focus detection area to the phase difference AF detection unit 42. The phase difference AF detection unit 42 performs A/D conversion of the image signal acquired from each line sensor to calculate a phase difference of an object image for each of the focus detection areas 50C, 50L, and 50R.

Arrangements of the openings on the visual field mask 51, condensing lenses 52C, 52L, and 52R, openings on the diaphragm mask 53, image formation lenses in the secondary image formation optical system, and line sensors on the sensor 55 corresponding to the focus detection areas 50C, 50L, and 50R respectively are adjusted and associated with each other in advance in manufacturing processes.

Figure 12A:
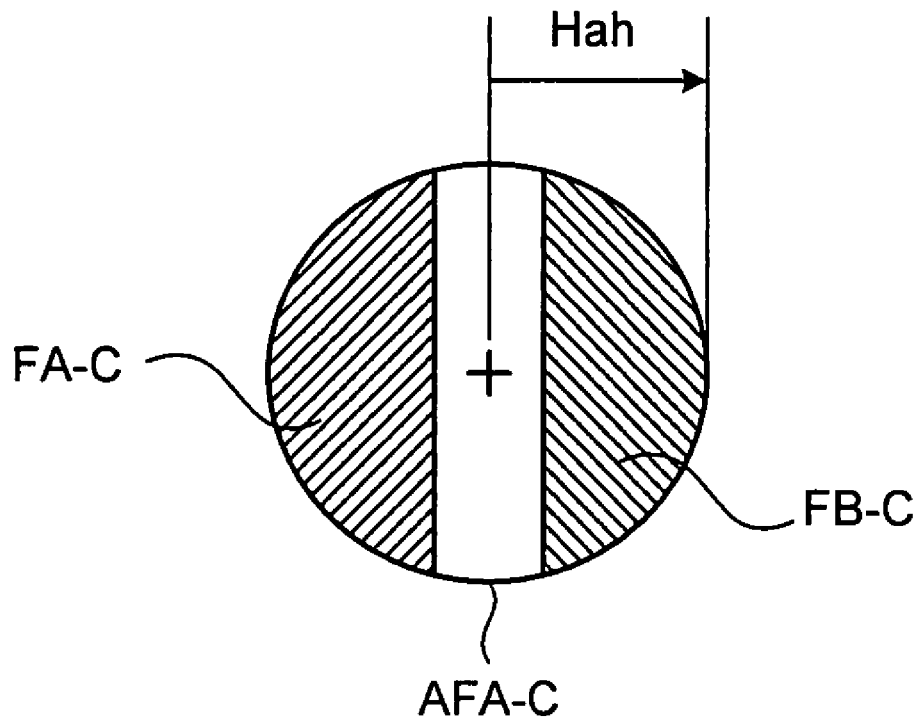
FIG. 12A is a diagram showing a state of light fluxes for focus detection in an exit pupil of a taking lens.
Figure 12B:
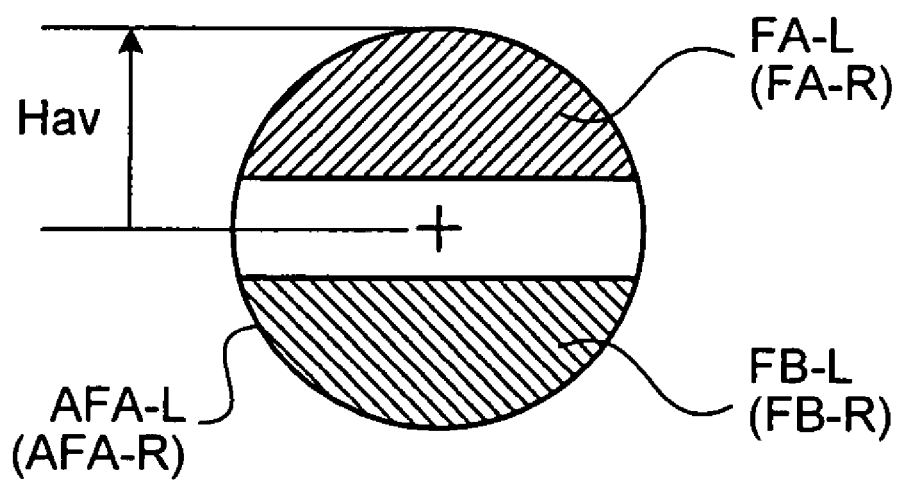
FIG. 12B is a diagram showing a state of light fluxes for focus detection in the exit pupil of the taking lens.

FIG. 12A and FIG. 12B are diagrams showing states of light fluxes for focus detection in the exit pupil EP of the taking lens 3. FIG. 12A shows a phase difference AF pupil area AFA-C corresponding to the focus detection area 50C and light fluxes FA-C and FB-C as light fluxes for focus detection. FIG. 12B shows a phase difference AF pupil area AFA-L corresponding to the focus detection area 50L and light fluxes FA-L and FB-L as light fluxes for focus detection. A phase difference AF pupil area AFA-R corresponding to the focus detection area 50R has the same size as the phase difference AF pupil area AFA-L and thus is shown in FIG. 12B together with light fluxes FA-R and FB-R as light fluxes for focus detection.

As shown in FIG. 12A and FIG. 12B, the pupil diameter of the phase difference AF pupil area corresponding to the focus detection area 50C and that corresponding to the focus detection areas 50L and 50R are different and, for example, a pupil radius Hah of the phase difference AF pupil area AFA-C is larger than a pupil radius Hav of the phase difference AF pupil areas AFA-L and AFA-R.

Next, a processing procedure for focusing processing performed by the digital camera 200 will be described. FIG. 13 is a flowchart showing the processing procedure for focusing processing. As shown in FIG. 13, the control unit 44 performs lens communication processing in the same manner as step S100 shown in FIG. 7 (step S200) when the digital camera 200 is turned on to determine whether the release switch 16 is halfway depressed (step S201).

If the release switch 16 is not halfway depressed (step S201: No), the control unit 44 repeats this determination processing and, if the release switch 16 is halfway depressed (step S201: Yes), the shading determination unit 44a performs shading determination processing to determine whether light fluxes for focus detection corresponding to each focus detection area are shaded (step S202). Details of this shading determination processing will later be described separately.

Then, based on a determination result of the shading determination processing, the AF control unit 44b determines whether shading occurs in all focus detection areas (step S203) and, if it is determined that shading occurs in all focus detection areas (step S203: Yes), performs contrast AF processing at step S217. If, on the other hand, it is determined that shading occurs not in all focus detection areas (step S203: No), the AF control unit 44b performs phase difference detection processing for focus detection area(s) where no shading occurs (step S204). At step S203, the AF control unit 44b determines whether shading occurs by referring to the shading determination flag showing a determination result of the shading determination processing.

At step S204, the AF control unit 44b detects an object image from light fluxes for focus detection by the phase difference AF sensor unit 41 for each focus detection area 50C, 50L, and 50R and, based on a signal of the object image, performs phase difference detection processing in which a phase difference is calculated using the phase difference AF detection unit 42. Further, the AF control unit 44b determines, based on the calculated phase difference, whether phase difference detection has been possible, reliability (degree of reliability) of phase difference detection and the like for each focus detection area 50C, 50L, and 50R and then records determination results thereof in flags.

After performing processing at step S204, the AF control unit 44b determines whether phase difference detection has been impossible in all focus detection areas where no shading occurs by referring to the flags in which the determination results at step S204 are recorded (step S205). Then, if phase difference detection has been impossible in all focus detection areas (step S205: Yes), the AF control unit 44b performs contrast AF processing at step S217 and, if there is any focus detection area where phase difference detection has not been impossible (step S205: No), selects a focus detection area (closest range focus detection area) whose focus deviation amount is closest to the back pin from among focus detection areas where phase difference detection is possible and no shading occurs in light fluxes for focus detection (step S206).

Subsequently, the AF control unit 44b determines whether the detected phase difference in the closest range focus detection area is within a predetermined range, that is, the focus deviation amount of the taking lens 3 is within the predetermined range (step S207) and, if it is determined that the phase difference is within the predetermined range (step S207: Yes), performs contrast AF processing at step S211. If, on the other hand, it is determined that the phase difference is not within the predetermined range (step S207: No), the AF control unit 44b calculates a driving amount of the taking lens 3 to bring the taking lens 3 into focus based on the calculated phase difference (step S208) and drives the taking lens 3 in accordance with the calculated driving amount (step S209).

The predetermined range to be a criterion at step S207 is a preset range so that, if found to be within this range, focusing can be performed by contrast AF processing with sufficiently high accuracy and at high speed. At step S209, the AF control unit 44b outputs the calculated driving amount to the lens control unit 7 so that the lens control unit 7 is caused to control the lens driving unit 5 to drive the taking lens 3.

After driving the taking lens 3, the AF control unit 44b performs phase difference detection processing again for the closest range focus detection area selected at step S206 (step S210) and, if it is determined that, by repeating processing of step S207 and the subsequent steps, a phase difference is within the predetermined range of step S207 and the subsequent steps, and the procedure advances to contrast AF processing at step S211.

Processing of subsequent step S211 to S216 is performed in the same manner as that of step S109 to S114 shown in FIG. 7. In contrast AF processing at step S217, on the other hand, the AF control unit 44b performs contrast AF processing for all focus detection areas to calculate a peak value of the evaluation value for each focus detection area and a driven position of the taking lens 3 corresponding to the peak value. Then, the AF control unit 44b performs closest range selection processing in which the taking lens 3 is driven to a driven position corresponding to a focus detection area whose focus deviation amount is closest to the back pin. Subsequently, the AF control unit 44b performs processing of step S212 and the subsequent steps.

In the digital camera 200, as described above, a coarse adjustment of focusing is made by the TTL phase difference AF as a basic operation and then a fine adjustment of focusing is made by the contrast AF. In addition, whether light fluxes for focus detection are shaded is determined for each of a plurality of focus detection areas of the TTL phase difference AF and, if it is determined that the light fluxes for focus detection are shaded in all focus detection areas, focusing processing by the contrast AF is performed without performing focusing processing by the TTL phase difference AF.

At steps S206 and S207, a focus detection area whose focus deviation amount closest to the back pin is selected in the above description, but such selection processing is not limited to this selection and, for example, a focus detection area may be selected based on selection information after acquiring the selection information of the focus detection areas from outside via an operation unit (not shown) of the digital camera 200.

Next, a processing procedure for shading determination processing shown as step S202 will be described. FIG. 14 is a flowchart showing the processing procedure for shading determination processing. As shown in FIG. 14, the shading determination unit 44a first initializes shading determination flags "a" to "c" by setting "0" to each flag (step S220) and determines whether a phase difference AF pupil diameter showing the size of the phase difference AF pupil area AFA-C corresponding to the focus detection area 50C in the center is larger than a taking lens pupil diameter showing the size of the taking lens pupil area EPA (step S221).

If the phase difference AF pupil diameter is larger than the taking lens pupil diameter (step S221: Yes), the shading determination unit 44a sets "1" to the shading determination flag "a" (step S222) before advancing to step S223. If, on the other hand, the phase difference AF pupil diameter corresponding to the focus detection area 50C is not larger than the taking lens pupil diameter (step S221: No), the shading determination unit 44a immediately advances to step S223.

At step S223, the shading determination unit 44a determines whether the phase difference AF pupil diameter showing the size of the phase difference AF pupil area AFA-R corresponding to the focus detection area 50R on a right side is larger than the taking lens pupil diameter and, if it is determined that the phase difference AF pupil diameter is larger than the taking lens pupil diameter (step S223: Yes), sets "1" to the shading determination flag "b" (step S224) before advancing to step S225. If, on the other hand, it is determined that the phase difference AF pupil diameter corresponding to the focus detection area 50R is not larger than the taking lens pupil diameter (step S223: No), the shading determination unit 44a immediately advances to step S225.

At step S225, the shading determination unit 44a determines whether the phase difference AF pupil diameter showing the size of the phase difference AF pupil area AFA-L corresponding to the focus detection area 50L on a left side is larger than the taking lens pupil diameter and, if it is determined that the phase difference AF pupil diameter is larger than the taking lens pupil diameter (step S225: Yes), sets "1" to the shading determination flag "c" (step S226) before returning to step S202. If, on the other hand, it is determined that the phase difference AF pupil diameter corresponding to the focus detection area 50L is not larger than the taking lens pupil diameter (step S225: No), the shading determination unit 44a immediately returns to step S202.

In the shading determination processing according to the second embodiment, as described above, the shading determination unit 44a compares each phase difference AF pupil diameter stored in the storage unit 15 in advance corresponding to the focus detection areas 50C, 50L, and 50R and the size of the taking lens pupil diameter read as lens information in the lens communication processing at step S200 and, if the phase difference AF pupil diameter is larger, determines that light fluxes for focus detection involved in phase difference focus detection processing are shaded and performs processing to record a determination result in each shading determination flag for each focus detection area.

In the digital camera 200 and the focusing device according to the second embodiment, as described above, even if there are a plurality of focus detection areas involved in phase difference focus detection processing, whether light fluxes for focus detection corresponding to each focus detection area are shaded can be determined and, if it is determined that shading occurs, the focus detection mechanism using the contrast AF is caused to perform focus detection and therefore, the focus can be adjusted at high speed and with high accuracy without being defocused by erroneous detection.

Next, a focusing device and digital camera according to a third embodiment of the present invention will be described. While the first and second embodiments described above are provided with an interchangeable lens having a taking lens of a general dioptric system, the third embodiment is provided with an interchangeable lens having a reflecting telephoto lens as a catadioptric system.

Figure 15:
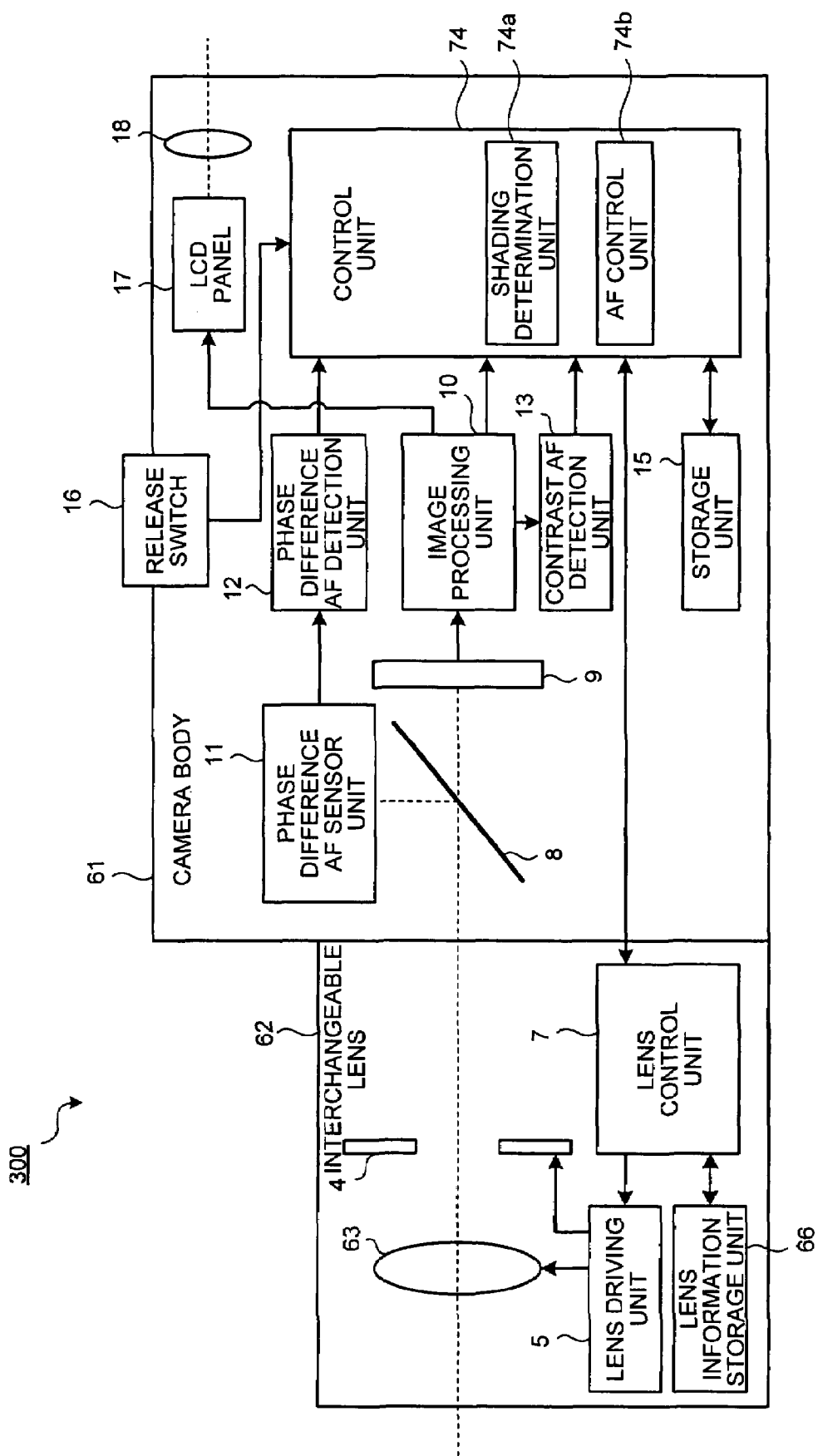
FIG. 15 is a diagram showing the configuration of a digital camera according to a third embodiment of the present invention.

FIG. 15 is a diagram showing the principal part configuration of a digital camera 300 according to the third embodiment. As shown in FIG. 15, the digital camera 300 comprises a camera body 61 and interchangeable lens 62. The camera body 61 is provided, based on the configuration of the camera body 1, with a control unit 74 in place of the control unit 14. The control unit 74 is provided, based on the configuration of the control unit 14, with a shading determination unit 74a and AF control unit 74b in place of the shading determination unit 14a and AF control unit 14b. The interchangeable lens 62 is provided, based on the configuration of the interchangeable lens 2, with a taking lens 63 and lens information storage unit 66 in place of the taking lens 3 and lens information storage unit 6.

The taking lens 63 is a reflecting telephoto lens comprising two reflectors and, for example, a reflecting telephoto lens disclosed in Japanese Patent Application Laid-Open No. 1-344736 may be used. Such a reflecting telephoto lens has advantages that a lens barrel can be made shorter than that of a telephoto lens as a dioptric system and also an overall weight of the lens can be made lighter. In FIG. 15, however, the taking lens 63 is shown as an integral lens to avoid complication. Moreover, the diaphragm 4 is actually provided inside the taking lens 63, but is shown separately from the taking lens 63 for convenience.

The lens information storage unit 66 stores a type of the taking lens 63, that is, a lens ID indicating a reflecting telephoto lens as lens information, in addition to the pupil diameter of the taking lens 63. The lens control unit 7 is electrically connected to the control unit 74 and, based on instructions from the control unit 74, controls processing and operations of the lens driving unit 5 and lens information storage unit 66 and also outputs lens information acquired from the lens information storage unit 66 to the control unit 74.

Figure 16A:
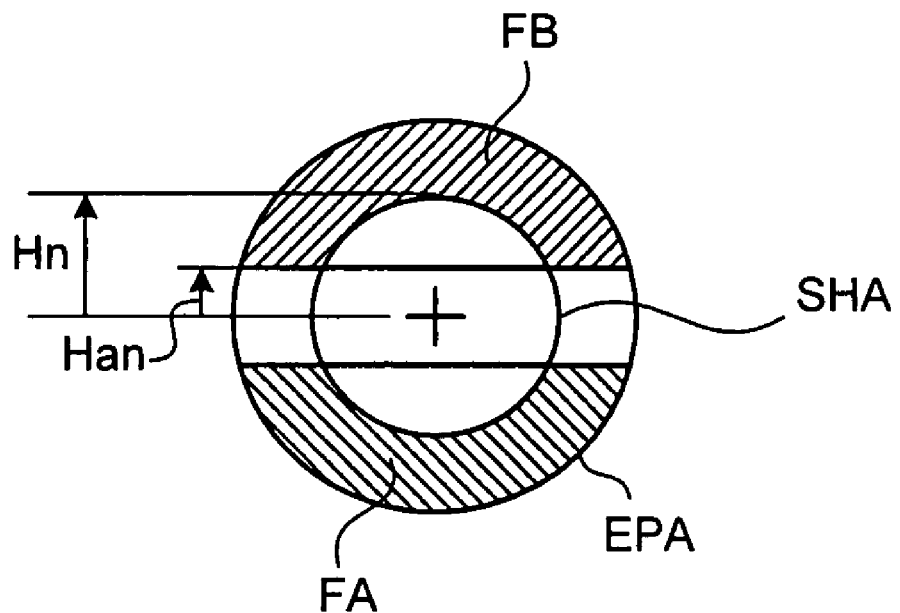
FIG. 16A is a diagram showing a state of light fluxes for focus detection in the exit pupil of the taking lens.

Meanwhile, the taking lens 63 as a reflecting telephoto lens reflects a light flux from an object inside the lens to turn back the reflected light flux to a focal plane and therefore one of reflectors is arranged inside the light flux. For this reason, a central part of the light flux is shaded and, as shown in FIG. 16A, the light flux is limited even in the central part of the pupil. Here, FIG. 16A shows that a circular pupil shading area SHA is formed by a reflector inside the taking lens pupil area EPA of the taking lens 63. Inner parts of the light fluxes FA and FB as light fluxes for focus detection are partially limited by the pupil shading area SHA.

Because of the above circumstances, it is not possible to correctly determine whether light fluxes for focus detection are shaded for the taking lens 63 solely based on the pupil diameter (pupil external diameter) or full-aperture FNO like shading determination processing in the first and second embodiments. Thus, in the third embodiment, whether light fluxes for focus detection are shaded is correctly determined by referring to a pupil external diameter and pupil internal diameter as pupil diameters of the taking lens pupil area in the taking lens 63 and comparing these pupil diameters with the size of the phase difference AF pupil area.

Figure 16B:
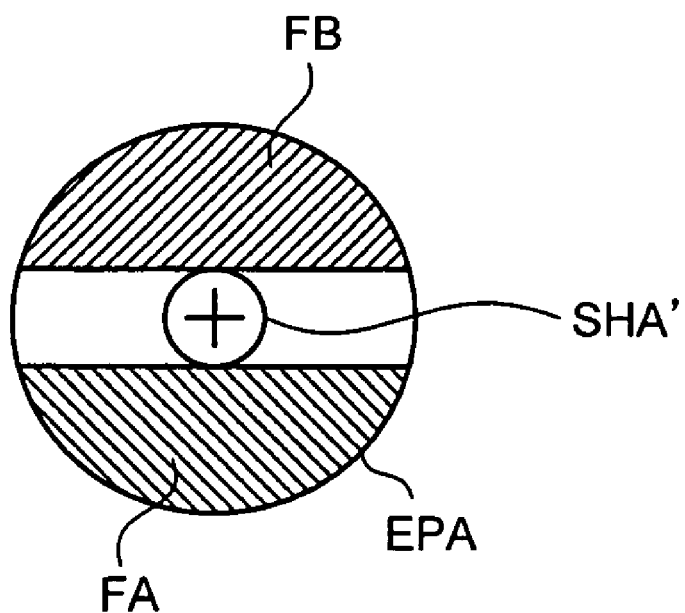
FIG. 16B is a diagram showing a state of light fluxes for focus detection in the exit pupil of the taking lens.

In FIG. 16A, the pupil internal diameter of the taking lens pupil area EPA is equal to a shading diameter of the pupil shading area SHA and the radius thereof is shown as a pupil internal radius Hn. If a pupil shading area SHA' is small as shown in FIG. 16B, the light fluxes FA and FB are not shaded by the pupil shading area SHA' even for a reflecting telephoto lens.

Figure 17:
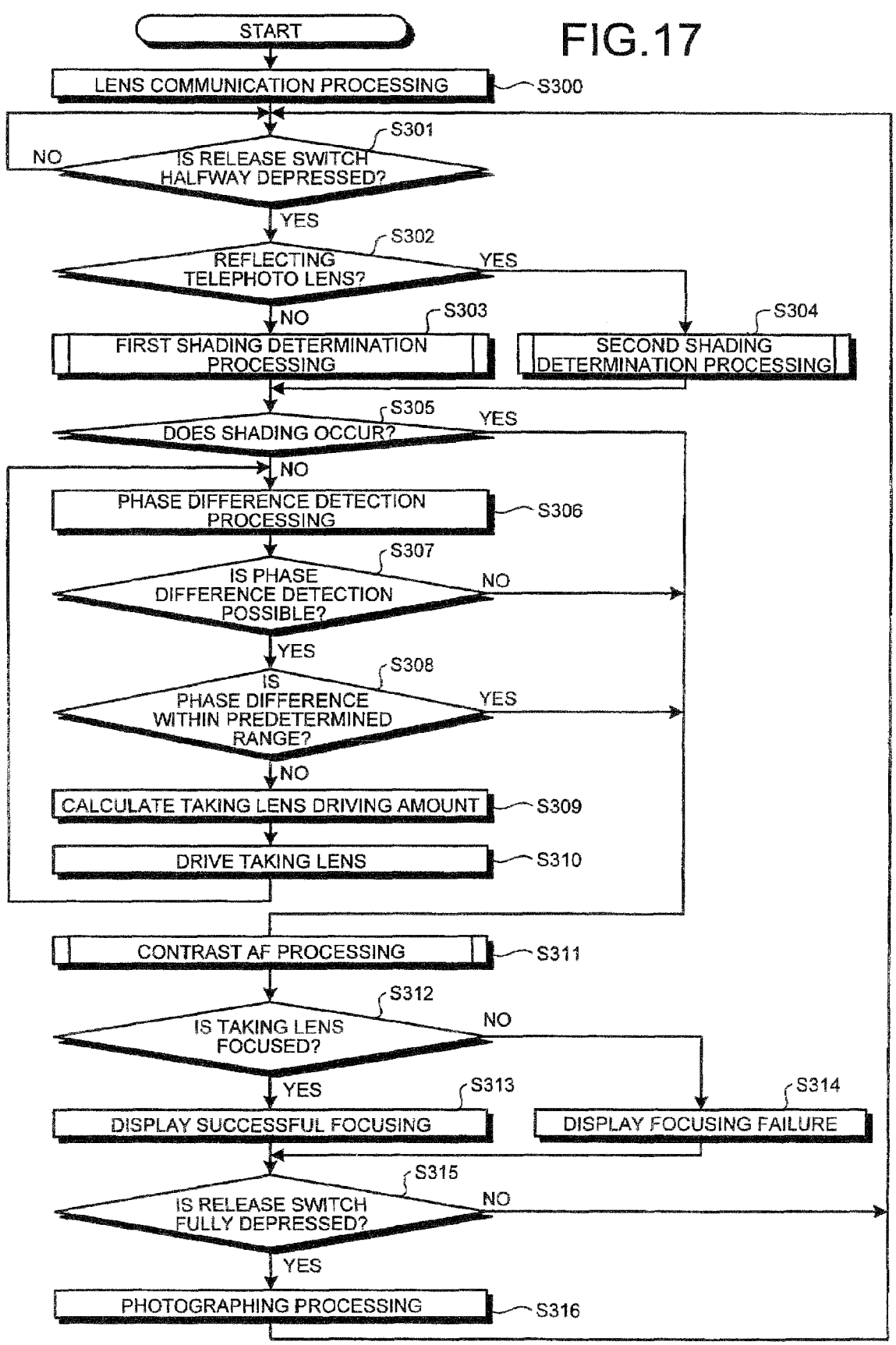
FIG. 17 is a flowchart showing a processing procedure for focusing processing according to the third embodiment.

Next, a processing procedure for focusing processing performed by the digital camera 300 will be described. FIG. 17 is a flowchart showing the processing procedure for focusing processing. As shown in FIG. 17, the control unit 74 communicates with the lens control unit 7 of the interchangeable lens 62 when the digital camera 300 is turned on to perform lens communication processing in which various kinds of lens information stored in the lens information storage unit 66 are read and also the lens information read from the lens information storage unit 66 is recorded in the storage unit 15 (step S300). Lens information read in the lens communication processing includes the pupil external diameter and pupil internal diameter of the taking lens 63, lens ID of the taking lens 63, driving range of the taking lens 63 in contrast AF processing, various correction values related to focusing processing and the like.

Subsequently, the control unit 74 determines whether the release switch 16 is halfway depressed (step S301) and, if the release switch 16 is not halfway depressed (step S301: No), repeats this determination processing. If, on the other hand, the release switch 16 is halfway depressed (step S301: Yes), the shading determination unit 74a refers to the lens ID to determine whether the taking lens 63 is a reflecting telephoto lens (step S302).

Then, if the taking lens 63 is not a reflecting telephoto lens (step S302: No), the shading determination unit 74a performs first shading determination processing (step S303) and, if the taking lens 63 is a reflecting telephoto lens (step S302: Yes), performs second shading determination processing (step S304). At step S303, the shading determination unit 74a determines whether light fluxes for focus detection are shaded by a processing procedure similar to the shading determination processing shown in FIG. 8. At step S304, the shading determination unit 74a refers to the pupil external diameter and pupil internal diameter of the taking lens 63 to determine whether light fluxes for focus detection are shaded. Details of the second shading determination processing will be described later separately.

Then, based on determination results of the first and second shading determination processing, the AF control unit 74b determines whether light fluxes for focus detection are shaded (step S305) and, if it is determined that light fluxes for focus detection are shaded (step S305: Yes), performs contrast AF processing at step S311. If, on the other hand, it is determined that light fluxes for focus detection are not shaded (step S305: No), the AF control unit 74b performs phase difference focus detection processing of step S306 and the subsequent steps. At step S305, the AF control unit 74b determines whether light fluxes for focus detection are shaded by referring to determination results of the first and second shading determination processing.

Subsequently, the control unit 74 performs processing of steps S306 to S316 in the same manner as steps 104 to S114 shown in FIG. 7 and also repeats processing of step S301 and the subsequent steps until a predetermined processing abort instruction such as power-off of the digital camera 300 is input.

In the digital camera 300, as described above, a coarse adjustment of focusing is made by the TTL phase difference AF as a basic operation and then a fine adjustment of focusing is made by the contrast AF. In addition, whether light fluxes for focus detection of the TTL phase difference AF are shaded is determined based on the first and second shading determination processing as shading determination processing in accordance with the lens ID of the taking lens 63 and, if it is determined that the light fluxes for focus detection are shaded, focusing processing by the contrast AF is performed without performing focusing processing by the TTL phase difference AF.

Figure 18:
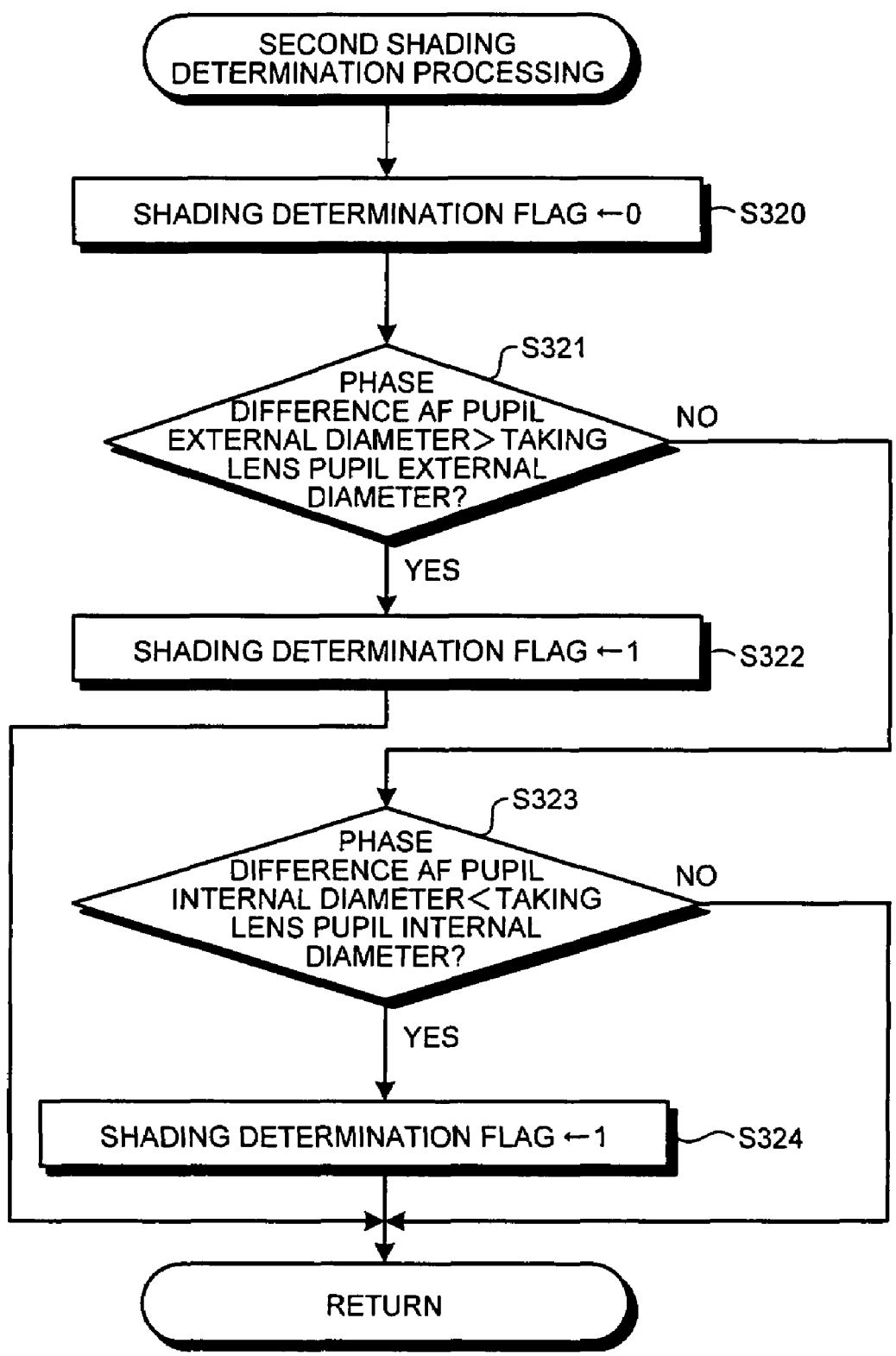
FIG. 18 is a flowchart showing a processing procedure for shading determination processing shown in FIG. 17.

Next, a processing procedure for the second shading determination processing shown as step S304 will be described. FIG. 18 is a flowchart showing the processing procedure for second shading determination processing. As shown in FIG. 18, the shading determination unit 74a first initializes the shading determination flag by setting "0" to the flag (step S320) and determines whether a phase difference AF pupil external diameter showing the external diameter of the phase difference AF pupil area is larger than a taking lens pupil external diameter showing the external diameter of the taking lens pupil area (step S321).

If the phase difference AF pupil external diameter is larger than the taking lens pupil external diameter (step S321: Yes), the shading determination unit 74a sets "1" to the shading determination flag (step S322) before returning to step S304. If, on the other hand, the phase difference AF pupil external diameter is not larger than the taking lens pupil external diameter (step S321: No), the shading determination unit 74a determines whether a phase difference AF pupil internal diameter showing the internal diameter of the phase difference AF pupil area is smaller than a taking lens pupil internal diameter showing the internal diameter of the taking lens pupil area (step S323). That is, at step 323, the shading determination unit 74a determines whether a pupil internal radius Han in the phase difference AF pupil area shown in FIG. 16A is smaller than the pupil internal radius Hn in the taking lens pupil area.

If the phase difference AF pupil internal diameter is smaller than the taking lens pupil internal diameter (step S323: Yes), the shading determination unit 74a sets "1" to the shading determination flag (step S324) before returning to step S304. If, on the other hand, the phase difference AF pupil internal diameter is not smaller than the taking lens pupil internal diameter (step S323: No), the shading determination unit 74a immediately returns to step S304.

In the second shading determination processing, as described above, the shading determination unit 74a compares the pupil external diameter and pupil internal diameter of the phase difference AF pupil area stored in advance in the storage unit 15 in accordance with the configuration of the phase difference AF sensor unit 11 and those of the taking lens pupil area read as lens information in the lens communication processing at step S300 to determine whether light fluxes for focus detection involved in phase difference focus detection processing will be shaded and records a determination result thereof in the shading determination flag.

In the digital camera 300 and the focusing device according to the third embodiment, as described above, whether the taking lens 63 is a reflecting telephoto lens is determined based on the lens ID as lens information and then, in accordance with this determination result, whether light fluxes for focus detection are shaded can be determined and, if it is determined that the light fluxes for focus detection are shaded, the focus detection mechanism using the contrast AF is caused to perform focus detection and therefore, the focus can be adjusted at high speed and with high accuracy without being defocused by erroneous detection even if a reflecting telephoto lens is used as a taking lens.

Next, a focusing device and digital camera according to a fourth embodiment of the present invention will be described. While, in the above first to third embodiments, whether light fluxes for focus detection involved in phase difference focus detection processing are shaded is determined based on the size of the taking lens pupil area when the diaphragm 4 is maximum, whether light fluxes for focus detection are shaded is determined in the fourth embodiment by also considering the pupil size of the taking lens when the diaphragm 4 is reduced.

Figure 19:
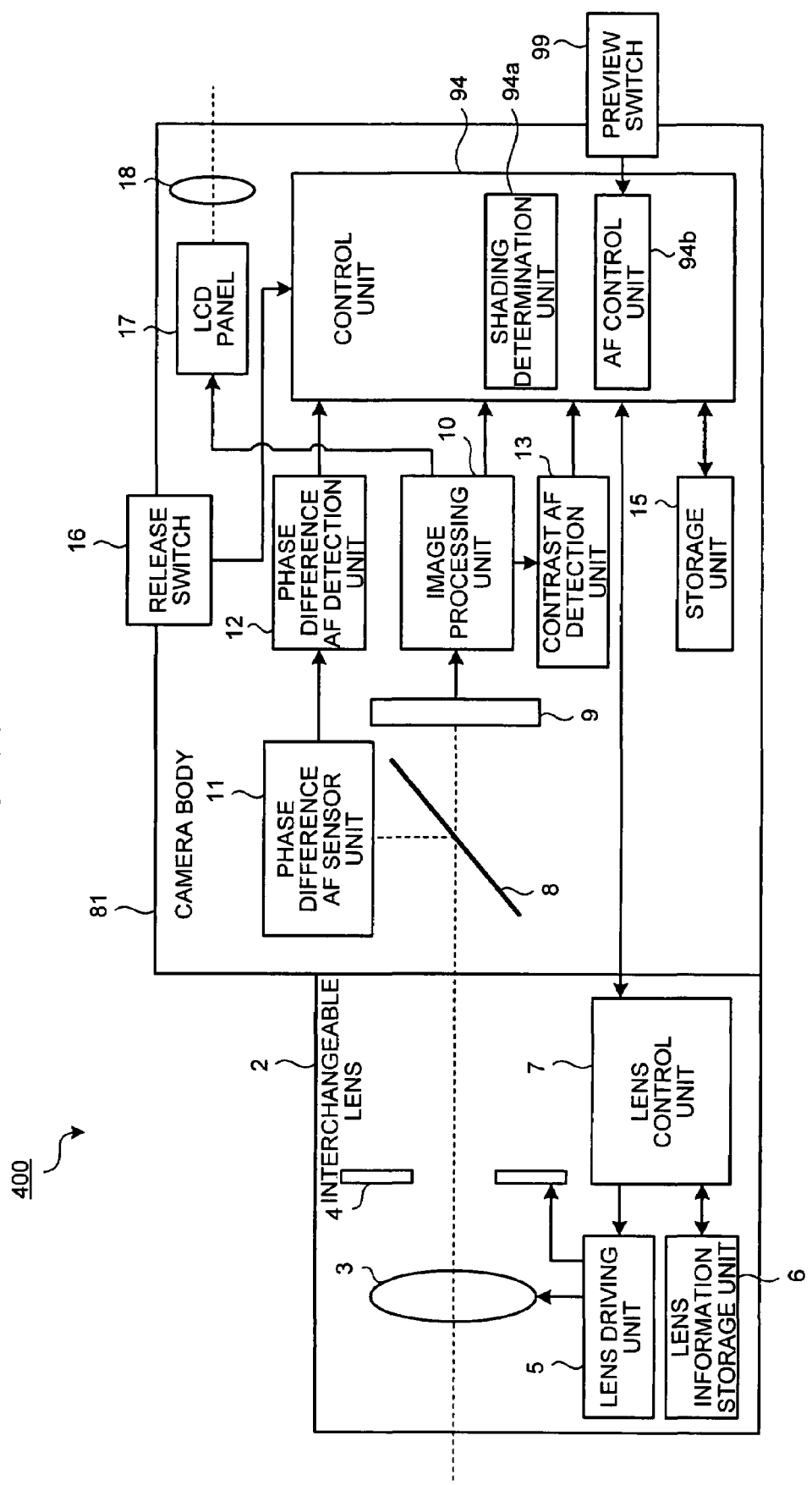
FIG. 19 is a diagram showing the configuration of a digital camera according to a fourth embodiment of the present invention.

FIG. 19 is a diagram showing the principal part configuration of a digital camera 400 according to the fourth embodiment. As shown in FIG. 19, the digital camera 400 is provided, based on the configuration of the digital camera 100, with a camera body 81 in place of the camera body 1. The camera body 81 is provided, based on the configuration of the camera body. 1, with a control unit 94 in place of the control unit 14 and further with a preview switch 99. The control unit 94 is provided, based on the configuration of the control unit 14, with a shading determination unit 94a and AF control unit 94b in place of the shading determination unit 14a and AF control unit 14b.

The preview switch 99 is configured as a switch having a button unit mounted on the surface of the camera body 81. When the button unit is depressed, the preview switch 99 outputs preview instruction information to perform preview processing to the control unit 94. In this case, the control unit 94 performs a control operation to reduce the diaphragm 4 to an F number preset as the F number equal to that during photographing to make preview processing to be performed so as to enable observation of a field equivalent to that during photographing through a finder and, based on the F number, to make shading determination processing to be performed in which whether light fluxes for focus detection are shaded is determined. The F number to which the diaphragm 4 is reduced in preview processing is stored in advance in the storage unit 15.

Figure 20:
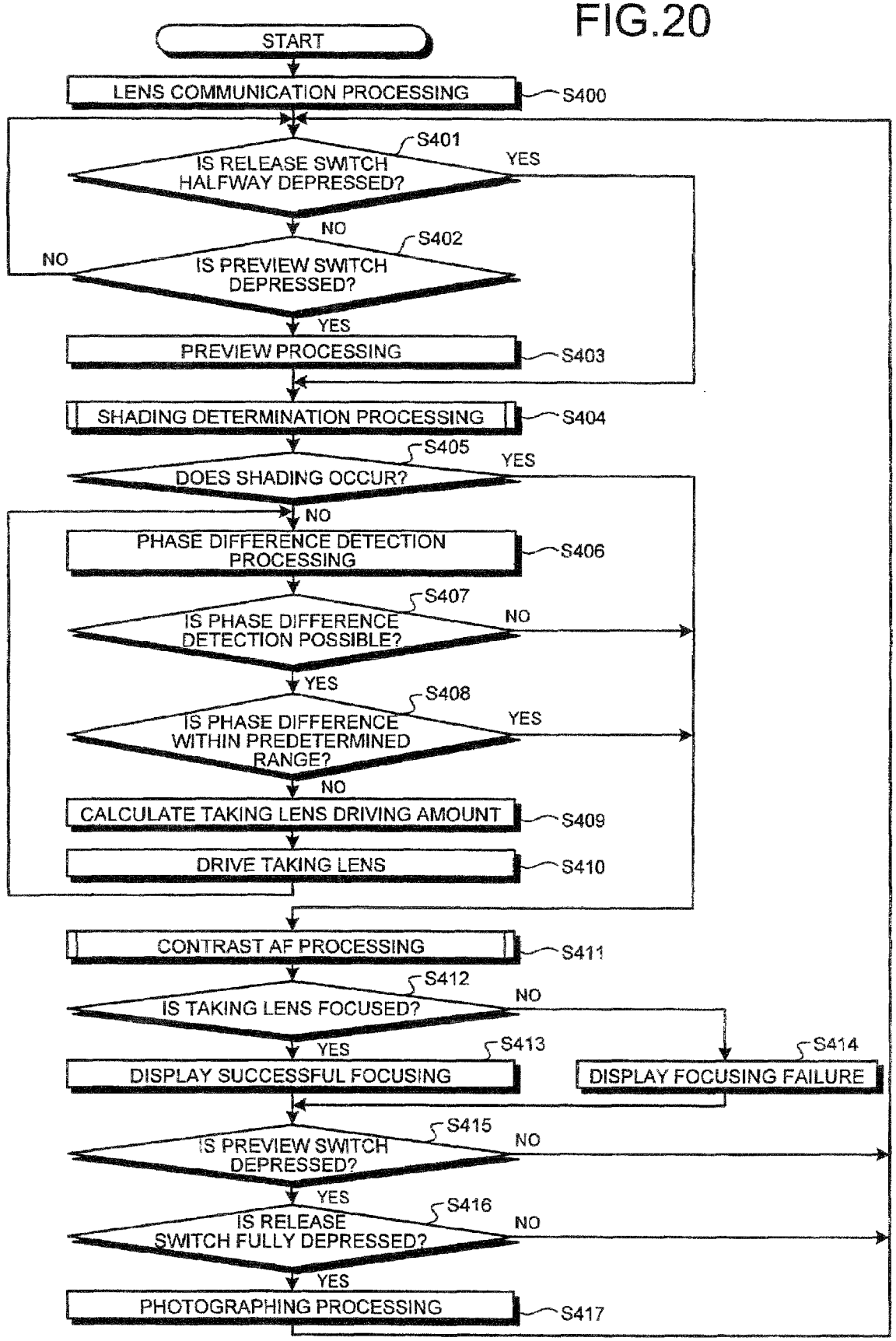
FIG. 20 is a flowchart showing a processing procedure for focusing processing according to the fourth embodiment.

Here, a processing procedure for focusing processing performed by the digital camera 400 will be described. FIG. 20 is a flowchart showing the processing procedure for focusing processing. As shown in FIG. 20, the control unit 94 performs lens communication processing in the same manner as step S100 shown in FIG. 7 when the digital camera 400 is turned on (step S400) before determining whether the release switch 16 is halfway depressed (step S401).

If the release switch 16 is not halfway depressed (step S401: No), the control unit 94 further determines whether the preview switch 99 is depressed (step S402) and, if the preview switch 99 is not depressed (step S402: No), repeats processing of step S401 and the subsequent steps. If the preview switch 99 is depressed (step S402: Yes), the control unit 94 performs preview processing (step S403). The control unit 94 determines that the preview switch 99 is depressed by acquiring preview instruction information from the preview switch 99.

After performing step S403 or if it is determined at step S401 that the release switch 16 is halfway depressed (step S401: Yes), the shading determination unit 94a performs shading determination processing in which whether light fluxes for focus detection are shaded is determined based on the F number of the diaphragm 4, that is, FNO of the taking lens 3 (step S404). Details of the shading determination processing will be described later separately.

Then, based on a determination result of the shading determination processing, the AF control unit 94b determines whether light fluxes for focus detection are shaded (step S405) and, if it is determined that shading occurs (step S405: Yes), performs contrast AF processing at step S411. If, on the other hand, it is determined that no shading occurs (step S405: No), the AF control unit 94b performs phase difference focus detection processing of step S406 and the subsequent steps.

At step S405, the AF control unit 94b determines whether shading occurs by referring to the shading determination flag showing a determination result of the shading determination processing.

Then, after performing processing of steps S406 to S414 in the same manner as steps 104 to S112 shown in FIG. 7, the control unit 94 determines whether the preview switch 99 is depressed (step S415) and, if the preview switch 99 is depressed (step S415: Yes), performs steps S416 and S417 in the same manner as steps S113 and S114 and then repeats processing of step S401 and the subsequent steps. If, on the other hand, the preview switch 99 is not depressed (step S415: No), the control unit 94 immediately repeats processing of step S401 and the subsequent steps. Such repeated processing terminates when a predetermined processing abort instruction such as power-off of the digital camera 400 is input.

In the digital camera 400, as described above, a coarse adjustment of focusing is made by the TTL phase difference AF as a basic operation and then a fine adjustment of focusing is made by the contrast AF. In addition, whether light fluxes for focus detection of the TTL phase difference AF are shaded is determined based on whether the preview switch 99 is depressed, that is, whether the diaphragm 4 is reduced and, if it is determined that shading occurs, focusing processing by the contrast AF is performed without performing focusing processing by the TTL phase difference AF.

Figure 21:
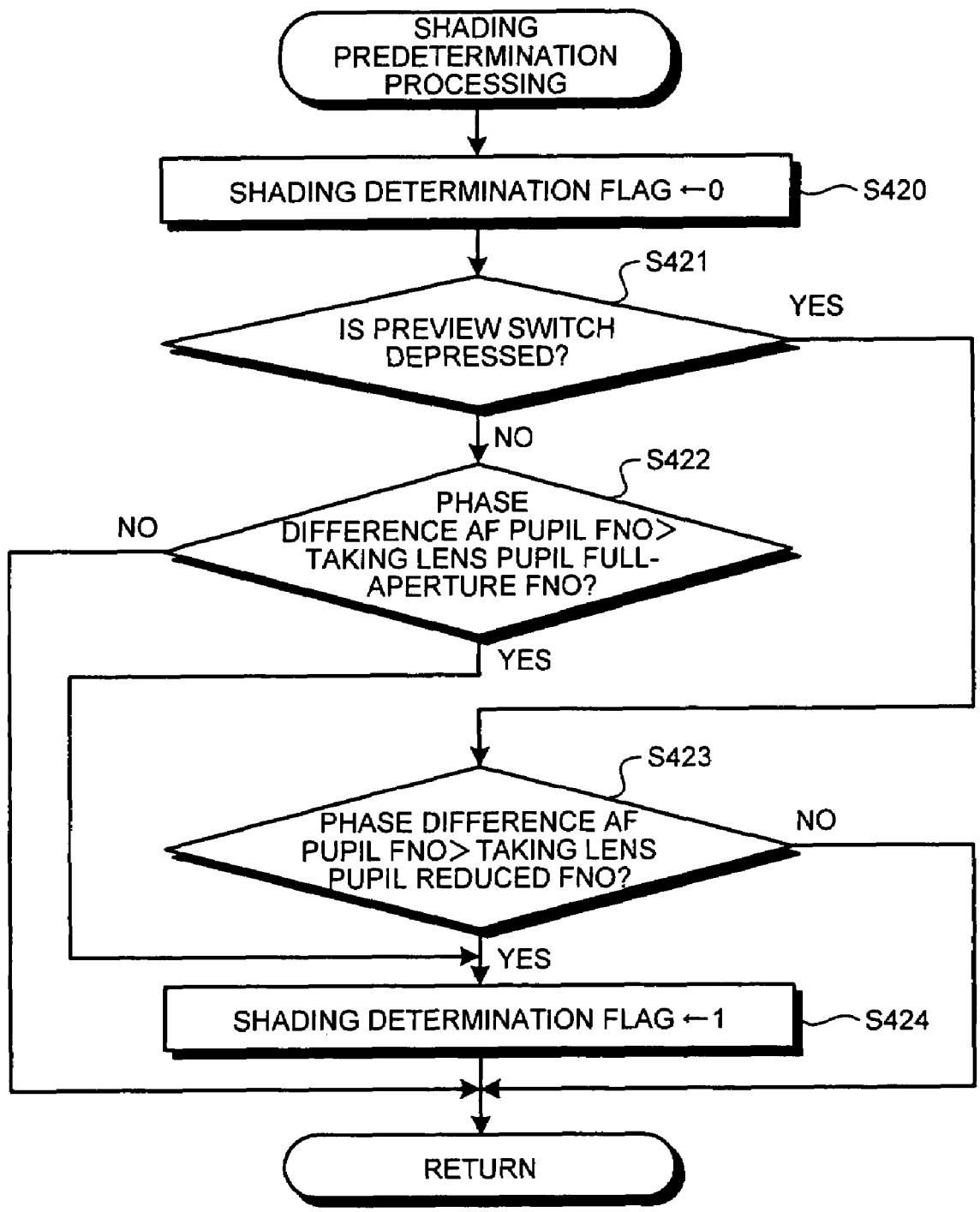
FIG. 21 is a flowchart showing a processing procedure for shading determination processing shown in FIG. 20.

Next, a processing procedure for shading determination processing shown as step S404 will be described. FIG. 21 is a flowchart showing the processing procedure for shading determination processing. As shown in FIG. 21, the shading determination unit 94a first initializes the shading determination flag by setting "0" to the flag (step S420) and determines whether the preview switch 99 is depressed (step S421).

If the preview switch 99 is not depressed (step S421: No), the shading determination unit 94a determines whether a phase difference AF pupil FNO corresponding to the phase difference AF pupil area is larger than a taking lens pupil full-aperture FNO showing the FNO of the taking lens 3 corresponding to a case in which the diaphragm 4 is maximum (step S422). Then, if it is determined that the phase difference AF pupil FNO is larger than the taking lens pupil full-aperture FNO (step S422: Yes), the shading determination unit 94a sets "1" to the shading determination flag (step S424) before returning to step S404 and, if it is determined that the phase difference AF pupil FNO is not larger than the taking lens pupil full-aperture FNO (step S422: No), immediately returns to step S404.

If, on the other hand, the preview switch 99 is depressed at step S421 (step S421: Yes), the shading determination unit 94a determines whether the phase difference AF pupil FNO is larger than a taking lens pupil reduced FNO showing the FNO of the taking lens 3 corresponding to the F number of the diaphragm 4 (step S423). Then, if it is determined that the phase difference AF pupil FNO is larger than the taking lens pupil reduced FNO (step S423: Yes), the shading determination unit 94a sets "1" to the shading determination flag (step S424) before returning to step S404 and, if it is determined that the phase difference AF pupil FNO is not larger than the taking lens pupil reduced FNO (step S423: No), immediately returns to step S404.

In the shading determination processing according to the fourth embodiment, as described above, the shading determination unit 94a determines whether light fluxes for focus detection involved in phase difference focus detection processing are shaded is determined by comparing the phase difference AF pupil FNO stored in the storage unit 15 in advance in accordance with the configuration of the phase difference AF sensor unit 11 and, depending on whether the preview switch 99 is depressed, the pupil diameter (pupil FNO) of the taking lens read as lens information in the lens communication processing at step S400 or the F number of the diaphragm 4 preset corresponding to preview processing and then records a determination result thereof in the shading determination flag.

In the digital camera 400 and the focusing device according to the fourth embodiment, as described above, whether light fluxes for focus detection are shaded can be determined based on the F number of the diaphragm 4 and, if it is determined that shading occurs, the focus detection mechanism using the contrast AF is caused to perform focus detection and therefore, the focus can be adjusted at high speed and with high accuracy without being defocused by erroneous detection even if the diaphragm 4 is reduced in preview processing.

The shading determination processing according to the fourth embodiment has been described that, if a F number is changed in accordance with preview processing, whether light fluxes for focus detection are shaded is determined based on the F number. However, determination whether light fluxes for focus detection are shaded can also be made based on the F number when the diaphragm 4 is manipulated by other processing than preview processing.

Meanwhile, preview processing is normally performed when an amount of diaphragm reduction is large and thus when preview processing is performed, it is highly probable that focus detection cannot be performed correctly by phase difference focus detection processing. Therefore, in this case, focus detection processing can be made to perform more reliably by not relying on shading determination and performing focus detection processing by the contrast AF without performing focus detection processing by the TTL phase difference AF.

Figure 22:
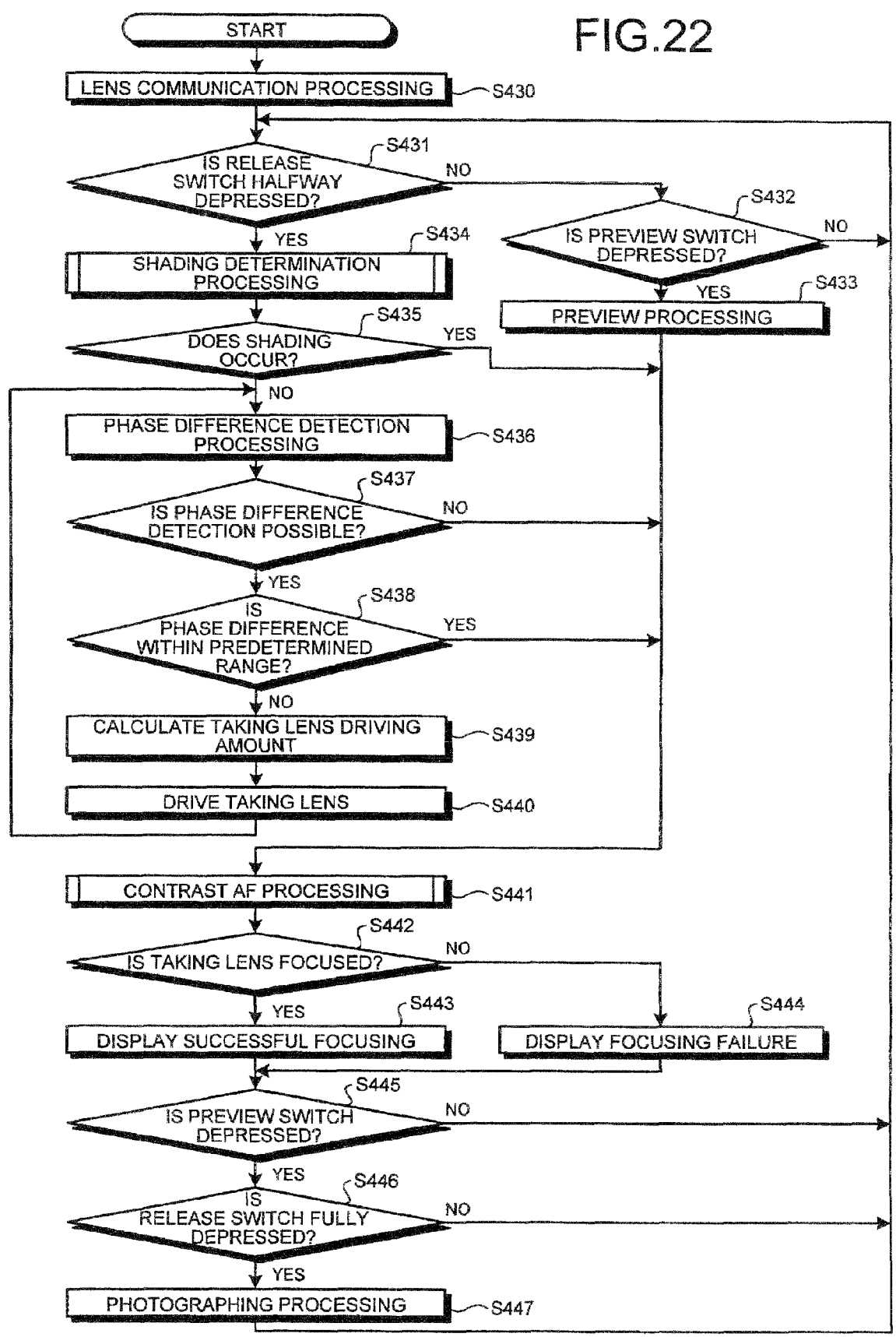
FIG. 22 is a flowchart showing a processing procedure for focusing processing according to a modification of the fourth embodiment.

FIG. 22 is a flowchart showing a processing procedure when such focusing processing is performed in the digital camera 400. In this case, the control unit 94 performs lens communication processing in the same manner as step S400 (step S430) to determine whether the release switch 16 is halfway depressed (step S431). Then, if it is determined that the release switch 16 is not halfway depressed (step S431: No), whether the preview switch 99 is depressed is further determined (step S432). If the preview switch 99 is not depressed (step S432: No), the control unit 94 repeats processing of step S431 and the subsequent steps. If, on the other hand, the preview switch 99 is depressed (step S432: Yes), the control unit 94 performs preview processing (step S433) and then performs contrast AF processing at step S441.

If it is determined that the release switch 16 is halfway depressed at step S431 (step S431: Yes), the shading determination unit 94a performs shading determination processing in the same manner as the processing procedure shown in FIG. 8. Then, based on a determination result of the shading determination processing, the AF control unit 94b determines whether light fluxes for focus detection are shaded (step 435) and, if it is determined that the light fluxes for focus detection are shaded (step 435: Yes), performs contrast processing at step S441. If, on the other hand, it is determined that the light fluxes for focus detection are not shaded (step 435: No), the AF control unit 94b performs phase difference focus detection processing of step 436 and the subsequent steps.

Subsequently, the control unit 94 performs processing at steps S436 to S447 in the same manner as steps 406 to S417 shown in FIG. 20 and repeats processing of step S431 and the subsequent steps until a predetermined processing abort instruction is input.

In the digital camera 400 according to the present modification, as described above, a coarse adjustment of focusing is made by the TTL phase difference AF as a basic operation and then a fine adjustment of focusing is made by the contrast AF. In addition, whether the preview switch 99 is depressed is determined and, if the preview switch 99 is depressed, focus detection processing by the contrast AF is immediately performed and, if the preview switch 99 is not depressed, whether light fluxes for focus detection of the TTL phase difference AF are shaded is further determined. If it is determined that shading occurs, focusing processing by the contrast AF is performed without performing focusing processing by the TTL phase difference AF. Accordingly, the digital camera 400 and the focus detection device according to the present modification can adjust the focus at high speed and with high accuracy when preview processing is performed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital camera adapted to have attached thereto a taking lens that forms an object image, wherein the taking lens has a focusing unit that focuses the taking lens, the camera comprising:
    an imaging device for picking up the object image;
    a first focus detection unit for performing focus detection based on a phase difference among a plurality of object images respectively taken through different pupil areas of the taking lens;
    a second focus detection unit for performing focus detection based on a contrast value of the object image;
    a determination unit for determining whether the focus detection by the first focus detection unit is possible by determining, based on lens information of the taking lens, whether shading occurs in respective light fluxes passing through the different pupil areas of the taking lens; and
    a control unit that controls the focusing unit to focus the taking lens based on a focus detection result of the first focus detection unit when the determination unit determines that the focus detection by the first focus detection unit is possible, and controls the focusing unit to focus the taking lens based on a focus detection result of the second focus detection unit when the determination unit determines that the focus detection by the first focus detection unit is not possible.

2. The digital camera according to claim 1, wherein the lens information includes F number information, and
    wherein the determination unit determines whether the respective light fluxes passing through the different pupil areas of the taking lens are shaded based on the F number information.

3. The digital camera according to claim 1, wherein the lens information includes lens type information, and
    wherein the determination unit determines whether the respective light fluxes passing through the different pupil areas of the taking lens are shaded based on the lens type information.

4. The digital camera according to claim 3, wherein the lens type information includes identification information identifying whether the taking lens is a reflecting telephoto lens.

5. The digital camera according to claim 1, wherein the taking lens has an adjustable diaphragm whose diaphragm diameter is adjustable,
    wherein the lens information includes diaphragm information showing the diaphragm diameter of the adjustable diaphragm, and
    wherein the determination unit determines whether the respective light fluxes passing through the different pupil areas of the taking lens are shaded based on the diaphragm information.

6. The digital camera according to claim 1, wherein a lens information storage unit stores the lens information of the taking lens.

7. A digital camera adapted to have attached thereto a taking lens that forms an object image, wherein the taking lens includes an adjustable diaphragm whose diaphragm diameter is adjustable, and has a focusing unit that focuses the taking lens, the camera comprising:
    an imaging device for picking up the object image;
    a first focus detection unit for performing focus detection based on a phase difference among a plurality of object images respectively taken through different pupil areas of the taking lens;
    a second focus detection unit for performing focus detection based on a contrast value of the object image;
    a switch;
    a setting unit for setting the adjustable diaphragm to a predetermined F number in accordance with an input operation with the switch;
    a determination unit for determining whether the focus detection by the first focus detection unit is possible by determining, based on the F number set by the setting unit, whether shading occurs in respective light fluxes passing through the different pupil areas of the taking lens; and
    a control unit that controls the focusing unit to focus the taking lens based on a focus detection result of the first focus detection unit when the determination unit determines that the focus detection by the first focus detection unit is possible, and controls the focusing unit to focus the taking lens based on a focus detection result of the second focus detection unit when the determination unit determines that the focus detection by the first focus detection unit is not possible.

8. The digital camera according to claim 7, wherein the setting unit sets the adjustable diaphragm to the predetermined F number during a photographing operation of the digital camera.

* * * * *